(12) United States Patent
Kim et al.

(10) Patent No.: US 8,180,417 B2
(45) Date of Patent: May 15, 2012

(54) PORTABLE TERMINAL

(75) Inventors: Min-Soo Kim, Gyeonggi-Do (KR); Won-Seok Joo, Seoul (KR)

(73) Assignee: LG Electronics Inc., Seoul (KR)

( * ) Notice: Subject to any disclaimer, the term of this patent is extended or adjusted under 35 U.S.C. 154(b) by 1007 days.

(21) Appl. No.: 12/138,274

(22) Filed: Jun. 12, 2008

(65) Prior Publication Data
US 2008/0307607 A1 Dec. 18, 2008

(30) Foreign Application Priority Data

Jun. 13, 2007 (KR) .................. 10-2007-0057881
Jun. 13, 2007 (KR) .................. 10-2007-0057882

(51) Int. Cl.
*H04M 1/02* (2006.01)
*H05K 5/00* (2006.01)

(52) U.S. Cl. ............... 455/575.4; 455/575.1; 361/679.3; 361/679.55; 361/679.56; 361/679.02

(58) Field of Classification Search .............. 455/575.4, 455/575.1; 361/600, 679.01, 679.02, 679.26, 361/679.3, 679.55, 679.56
See application file for complete search history.

(56) References Cited

U.S. PATENT DOCUMENTS

| | | | |
|---|---|---|---|
| 7,353,052 B2 * | 4/2008 | Yamasaki ............... | 455/575.4 |
| 7,437,186 B2 * | 10/2008 | Park ............... | 455/575.4 |
| 7,469,156 B2 * | 12/2008 | Kota et al. ............... | 455/575.4 |
| 7,522,945 B2 * | 4/2009 | Kilpi et al. ............... | 455/575.1 |
| 7,526,326 B2 * | 4/2009 | Vance et al. ............... | 455/575.7 |
| 7,633,745 B2 * | 12/2009 | Sakakibara et al. ..... | 361/679.11 |
| 7,636,592 B2 * | 12/2009 | Kim et al. ............... | 455/575.4 |
| 7,916,473 B2 * | 3/2011 | Jang ............... | 361/679.55 |
| 2003/0122690 A1 * | 7/2003 | Hsu ............... | 341/22 |
| 2003/0125081 A1 * | 7/2003 | Boesen ............... | 455/556 |
| 2003/0197628 A1 * | 10/2003 | Hsu ............... | 341/22 |
| 2004/0157653 A1 * | 8/2004 | Kato ............... | 455/575.4 |
| 2005/0009581 A1 * | 1/2005 | Im et al. ............... | 455/575.4 |
| 2005/0059443 A1 * | 3/2005 | Pan et al. ............... | 455/575.4 |
| 2005/0282597 A1 * | 12/2005 | Park et al. ............... | 455/575.4 |
| 2006/0128449 A1 * | 6/2006 | Park ............... | 455/575.4 |
| 2007/0032278 A1 * | 2/2007 | Lee et al. ............... | 455/575.4 |
| 2007/0155447 A1 * | 7/2007 | Gordecki ............... | 455/575.4 |
| 2007/0155449 A1 * | 7/2007 | Kim et al. ............... | 455/575.4 |
| 2007/0155451 A1 * | 7/2007 | Lee ............... | 455/575.4 |
| 2007/0197270 A1 * | 8/2007 | Kim ............... | 455/575.4 |
| 2008/0167098 A1 * | 7/2008 | Mizuta et al. ............... | 455/575.4 |
| 2008/0194304 A1 * | 8/2008 | Satoshi et al. ............... | 455/575.4 |
| 2008/0311963 A1 * | 12/2008 | Strawn ............... | 455/575.1 |

* cited by examiner

*Primary Examiner* — Matthew Sams
(74) *Attorney, Agent, or Firm* — Birch, Stewart, Kolasch & Birch, LLP

(57) ABSTRACT

A mobile terminal has an opening and closing mechanism in which when an appropriate force is applied to the upper body to achieve a sliding movement with respect to the lower body, the upper body can be moved in a planar direction along the lower body and then in a non-planar direction to implement an open configuration.

24 Claims, 20 Drawing Sheets

PORTABLE TERMINAL

CROSS-REFERENCE TO RELATED APPLICATIONS

This application claims priority to Korean Patent Applications No. 10-2007-0057881, filed Jun. 13, 2007, and Korean Patent Application No. 10-2007-0057882, filed Jun. 13, 2007, both of which are herein incorporated by reference.

BACKGROUND

The present invention relates to an opening and closing mechanism of a mobile terminal.

A mobile terminal is a device that can be carried around and has one or more functions such as voice and video call communication, inputting and outputting information, storing data, and the like.

As such functions become more diversified, the mobile terminal can support more complicated functions such as capturing images or video, reproducing music or video files, playing games, receiving broadcast signals, and the like. By comprehensively and collectively implementing such functions, the mobile terminal may be embodied in the form of a multimedia player or device.

In order to implement various functions of such multimedia players or devices, the multimedia player requires sufficient support in terms of hardware or software, for which numerous attempts are being made and implemented. For example, a user interface allowing users to easily and conveniently search for and select one or more functions continues to be developed.

Also, as users consider their mobile terminal to be a personal portable device that may express their personality, form factors are being diversified for users' easy selection according to their personalities. The typical types of mobile terminals include a bar type terminal including input/output units and display disposed at one body, a folder type terminal or a swing type terminal in which one body is rotatably opened or closed with respect to another body, or a slide type terminal in which one body is slidably opened or closed with respect to another body.

Among them, the slide type terminal is preferred for its advantages that its opening operation is simple and its display is always exposed from the terminal for users easy recognition. However, the slide type terminal has a problem in that if one body is slidably moved with respect to another body, a step is formed therebetween, destabilizing structurally the bodies that may lead to deformation of its aesthetical appearance.

SUMMARY

The present inventors recognized certain drawbacks of the related art, as explained above. Upon such recognition, the following concepts and features have been conceived.

One technical purpose of the present invention is to provide a mobile terminal having a structural stability in terms of its external appearance by minimizing formation of a step when one body is slidably moved with respect to another body while utilizing a wide user interface region in the open configuration.

Thus, a mobile terminal includes a lower body having a first upper surface and a second upper surface positioned to be lower than the first upper surface; an upper body disposed on the lower body and having a first lower surface and a second lower surface lower than the first lower surface; and a guide unit that guides the upper and lower bodies to be moved resersibly between a closed configuration in which the first and second upper surfaces face the first and second lower surfaces, respectively, and an open configuration in which the second upper surface faces the first lower surface and the upper body is lowered in a non-planar direction compared with the closed configuration.

In the open configuration, an upper surface of the upper body and the first upper surface of the lower body exposed according to a movement of the upper body may be flush with each other.

In the open configuration, a lower surface of the lower body and a lower surface of the upper body exposed according to a movement of the lower body may be flush with each other.

The first and second upper surfaces may be connected by a slope face.

The first and second lower surfaces may be connected by a counter slope face corresponding to the slope face.

The guide unit may include: a pair of first guide rails formed at both sides of the lower body; and first arm portions formed at both sides of the upper body and restrained to (curbed to or engaged with) the first guide rails.

The guide unit may further include: second guide rails formed at both sides of the upper body and disposed to cross the first guide rails; and second arm portions formed at both sides of the lower body and restrained to the second guide rails.

The first guide rails may include: a first horizontal portion formed to be parallel to the first upper surface of the lower body; a second horizontal portion formed to be parallel to the second upper surface of the lower body; and a slope portion formed to be parallel to the slope face of the lower body, and the second guide rails may include: a counter first horizontal portion, a counter second horizontal portion and a counter slope portion corresponding to the first horizontal portion, the second horizontal portion and the slope portion.

The first and second guide rails may be formed to be opened in the lateral direction of the lower and upper bodies.

The mobile terminal may further include: an elastic unit that provides elastic force to the first body when the first body is moved with respect to the second body.

The elastic unit may include: a first slide member fixed on the lower surface of the upper body; a second slide member slidably restrained to the second slide member; a spring formed such that one end thereof is restrained in the first slide member and the other end is restrained to the second slide member, and deformed to provide elastic force to the first slide member while the first slide member is being moved; and a link member formed such that one end thereof is restrained to the lower body and the other end is restrained to the second slide member.

The spring may be installed such that its the restoration energy is retained (or stored) as the upper body is moved to a first distance, and after the upper body passes the dead point, the upper body is moved for a second distance by the restoration energy.

The link member may have a particular length that allows it to rotate within an acute angle range with respect to the upper surface of the upper body, such that the upper body can move between the closed configuration to the open configuration.

A display for displaying information and a first manipulation unit for inputting information may be disposed on the upper surface of the upper body, and a second manipulation unit for inputting information may be disposed on the first upper surface of the lower body.

Also, a mobile terminal includes: a lower body having a first upper surface and a second upper surface positioned to be lower than the first upper surface; an upper body disposed on the lower body, having a first lower surface and a second lower surface lower than the first lower surface, and connected with the lower body to implement a closed configuration in which the first and second upper surfaces face the first and second lower surfaces, respectively and an open configuration in which the second upper surface faces the first lower surface and the upper body is lowered in a non-planar direction compared with the closed configuration; and an operating module that locks the upper body such that when an appropriate force is applied to the upper body to achieve a sliding movement with respect to the lower body, the upper body is moved in a planar direction along the lower body and then in a non-planar direction to make an open configuration, and that returns the upper body to a closed configuration when the locking state is released.

The operating module may include: a fixed member fixed to a lower surface of the upper body; a guide member restrained to the fixed member and guiding the fixing member so as to be moved in a planar direction; a link member formed such that one end is rotatably supported by the guide member and the other end is rotatably supported by an upper surface of the lower body, to thus move the fixed member and the guide member in a non-planar direction; and a locking unit that locks the upper body when the fixed member and the guide member are moved in a non-planar direction by the link member.

The fixed member may be formed as a plate form parallel to the lower surface of the upper body, and the guide member may be formed to cover both ends of the fixed member.

The link members may be formed as a pair such that they are spaced apart with a certain distance in the movement direction of the lower body.

A first spring may be installed between the guide member and the link member in order to apply a restoring force in the direction in which the guide member moves toward the closed configuration.

A second sprig may be installed between the link member and the lower body in order to apply a restoring force to the link member in a direction in which the upper body is lifted.

The locking unit may include: a stop protrusion formed to be protruded from one side of the upper body; and a stop recess allowing the stop protrusion to be caught therein when the upper body is in the open configuration.

The locking unit may include: a first magnet unit disposed on the lower surface of the upper body; and a second magnet unit disposed on the upper surface of the lower body such that it maintains the open configuration by means of the first magnet unit and the attraction when the upper body is in the open configuration, and it thrusts the upper body in a non-planar direction by means of the first magnet unit and the repulsion when the upper body is moved with a certain distance.

The first and second magnet units may be disposed to be parallel to each other.

A chamfer may be formed at a lower end of the upper body in order to prevent the upper body from being interfered with by the lower body when the upper body is moved to the open configuration.

A display for displaying information and a first manipulation unit for inputting information may be disposed on the upper surface of the upper body, and a second manipulation unit for inputting information may be disposed on the first upper surface of the lower body.

DETAILED DESCRIPTION

The mobile terminal according to exemplary embodiments of the present invention will now be described with reference to the accompanying drawings.

As can be understood from the Figures, a mobile terminal (i.e., mobile phone or other electronic device) having the structure or form factor of the present invention may be referred to (or expressed) in many different ways.

For example, the mobile terminal may be said to have an "anti-parallel" form factor due to the orientation and movement directions of the upper and lower bodies. Such mobile terminal may also be considered as a "slider-bar" type, because both a slider-type configuration and a bar-type configuration can be achieved.

When such mobile phone is opened and closed, because the movements involved are planar (i.e., a sliding movement) and non-planar (i.e., a movement that is substantially perpendicular or non-parallel to the sliding direction), such mechanism may be referred to as a "slide-slip" (i.e., the upper body slips into place when the mobile phone is opened) or a "slide-shift" (i.e., the upper body shifts into place when the mobile phone is opened).

Such movements may also be considered as being slide-step (i.e. the upper body is stepped down upon opening), slide-press (i.e. the user slides the upper body and then presses it down into place), slide-flat (i.e. the profile of the mobile phone becomes substantially flat after sliding open), spread out (i.e. the upper and lower bodies are spread flat), and the like.

When the mobile phone is to be closed, several different operations may be possible. For example, the user may press down at a portion of the upper body (that is flat with respect to the lower body in the opened state), and elastic restoration then forces the upper body to pop-up and retract back onto the lower body to be stacked thereon. Alternatively, in the opened state, the user may further push the upper body such that it extends further away in a parallel direction from the lower body, and elastic restoration allows the upper body to elevate (or rise up) and jump on top of the lower body to be stacked thereon.

Also, because this form factor is achieved by a combination of a slide assembly and a link assembly such mechanism may be referred to as a parallel motion linkage, a reverse motion linkage, a sliding linkage, a Z-slide mechanism (due to its Z-shape when seen from its side), or the like.

Figure 1:
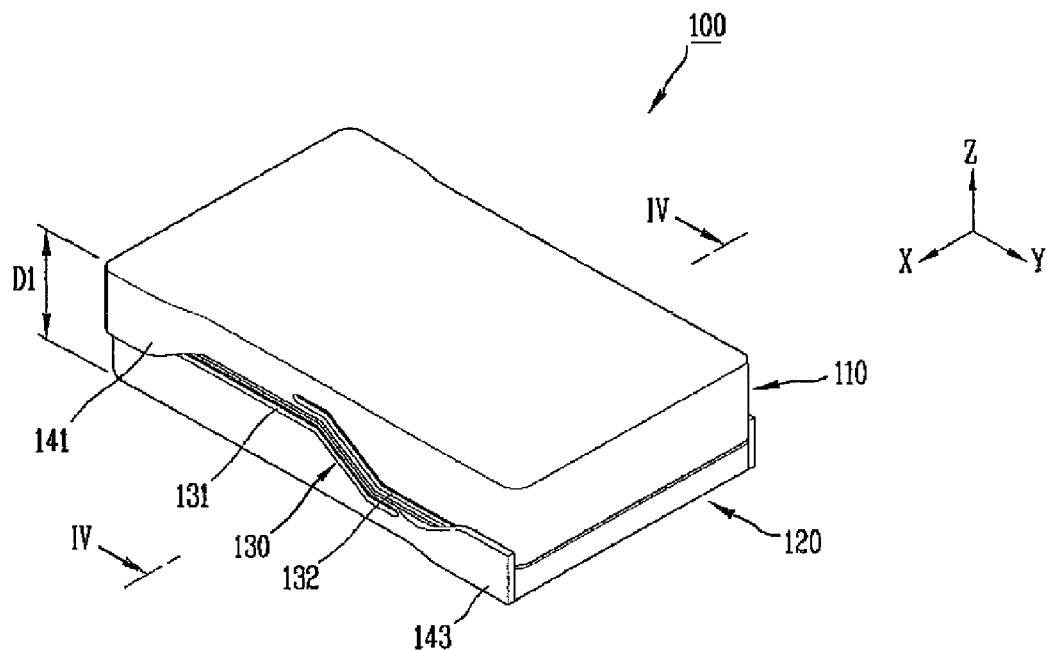
FIG. 1 is a front perspective view of a mobile terminal according to one exemplary embodiment of the present invention.
Figure 2:
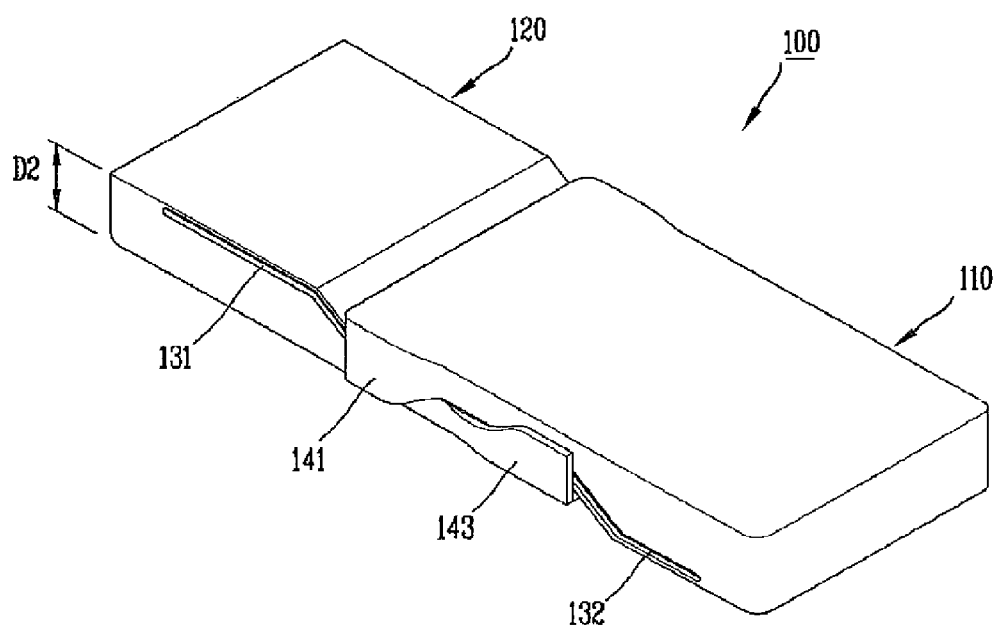
FIG. 2 is a front perspective view showing an open configuration of the mobile terminal in FIG. 1.

FIG. 1 is a front perspective view of a mobile terminal according to one exemplary embodiment of the present invention, and FIG. 2 is a front perspective view showing an open configuration of the mobile terminal in FIG. 1.

As shown in FIGS. 1 and 2, a mobile terminal 100 includes an upper body 110 and a lower body 120 that are combined to be movable with each other. Functions or components may be disposed in the upper body 110 and the lower body 120 in various manners depending on what kind of functions or user interface the terminal 100 intends to have. For example, a display may be installed on the upper body 110 and a keypad may be installed on the lower body 120. If the mobile terminal 100 intends to have a visual output function, both the upper body 110 and the lower body 120 may include the displays.

Guide units 130 are formed on both sides of the upper and lower bodies 110 and 120 in order to guide the upper and lower bodies 110 and 120 so as to be movable.

Figure 3:
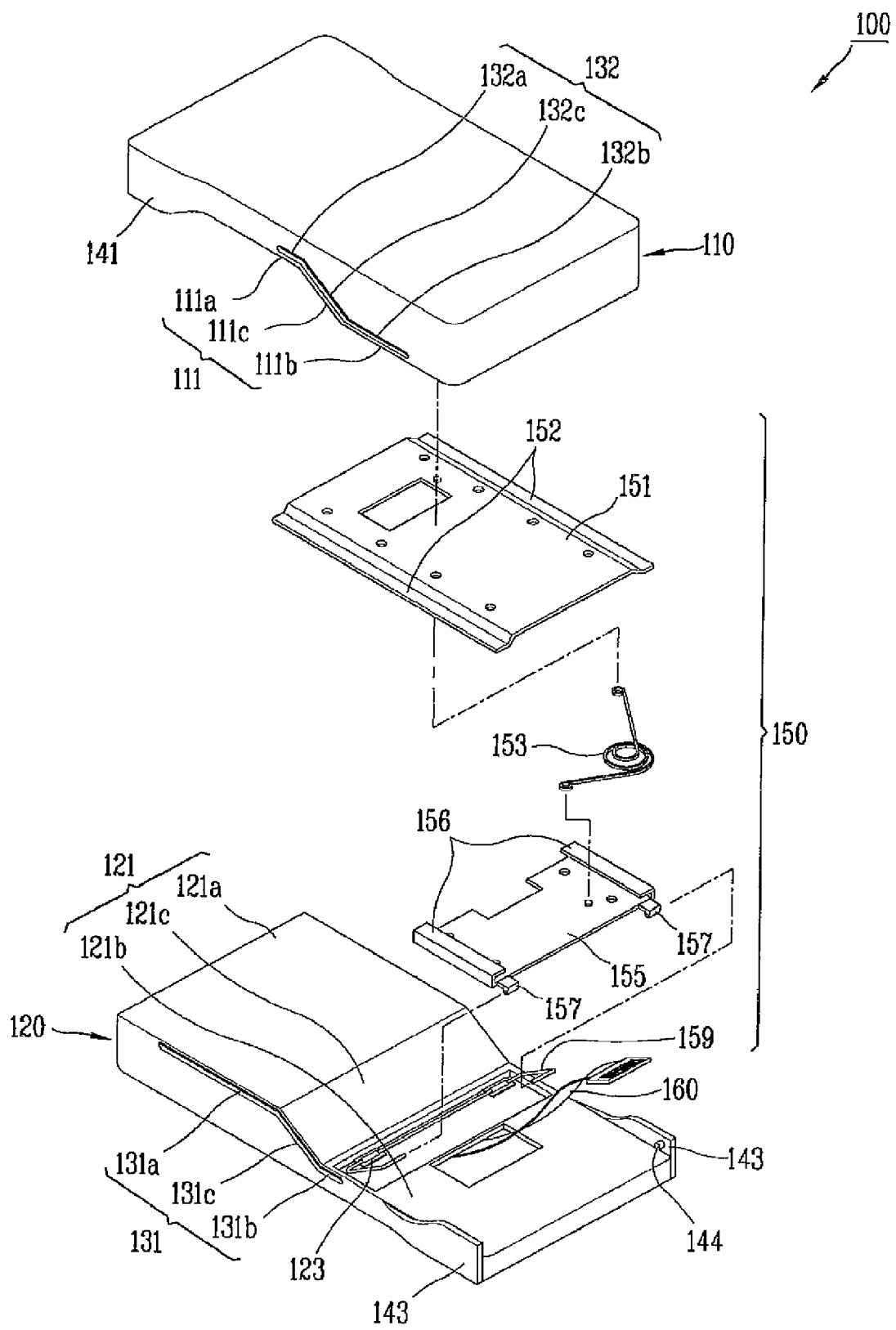
FIG. 3 is an exploded perspective view of the mobile terminal according to an exemplary embodiment of the present invention.

FIG. 3 is an exploded perspective view of the mobile terminal according to an exemplary embodiment of the present invention. As shown in FIG. 3, an upper surface 121 of the lower body 120 includes a first upper surface 121a exposed when the upper body 110 is in an open configuration, a second upper surface 121b formed to be lower than the first upper surface 121a, and a slope face 121c connecting the first and second upper surfaces 121a and 121b.

A lower surface 111 of the upper body 110 includes a first lower surface 111a, a second lower surface 111c, and a counter slope face 111c formed to have the reverse configuration to correspond to the first upper surface 121a, the second upper surface 121b and the slope face 121c of the lower body 120. The upper body 110 and the lower body 120 may be formed to be antiparallel with each other.

The guide unit 130 restricts the closed configuration and open configuration of the upper body 110 with respect to the lower body 120. Namely, in the closed configuration as shown in FIG. 1, the first and second upper surfaces 121a and 121b are disposed to face the first and second lower surfaces 111a and 111b. In the open configuration as shown in FIG. 2, the first upper surface 121a is exposed and only the second upper surface 121b faces the first lower surface 111a, and in this state, the upper body 110 is positioned to be lower compared to the closed configuration. The guide unit 130 guides the upper and lower bodies 110 and 120 to reversibly implement the closed configuration and the open configuration. In the closed configuration, when an appropriate force is applied to the upper body 110 to achieve a sliding movement with respect to the lower body 120, the upper body is moved in a planar direction along the lower body 120 and then in a non-planar direction so as to be opened by means of the guide unit 130.

In the open configuration, the upper surface of the upper body 110 and the upper surface of the lower body 120 exposed according to the movement of the upper body 110 are flush with each other. Namely, because the upper body 110 is moved in both the planar and then non-planar directions by the guide unit 130, a formation of a step caused as an upper surface of the upper body 110 is higher than the upper surface of the lower body 120 can be prevented, obtaining the structural stability in the external appearance. In addition, in the open configuration, it is also possible to allow the lower surface of the lower body 120 and the lower surface of the upper body 110 exposed according to a movement of the lower body 120 to be flush with each other.

As shown in FIG. 2, when the upper body 110 is in the open configuration with respect to the lower body 120, the upper surface of the upper body 110 and the first upper surface 121a of the lower body 120 exposed according to the movement of the upper body 110 are flush with each other, and the lower surface of the lower body 120 and the lower surface of the upper body 110 exposed according to the movement of the lower body 120 are flush with each other. Namely, the upper body 110 and the lower body 120 may have an external appearance similar to a bar type mobile terminal. In this case, the open configuration allows to secure wider surface in terms of using and implementing functions and facilitates manipulation.

Figure 4:
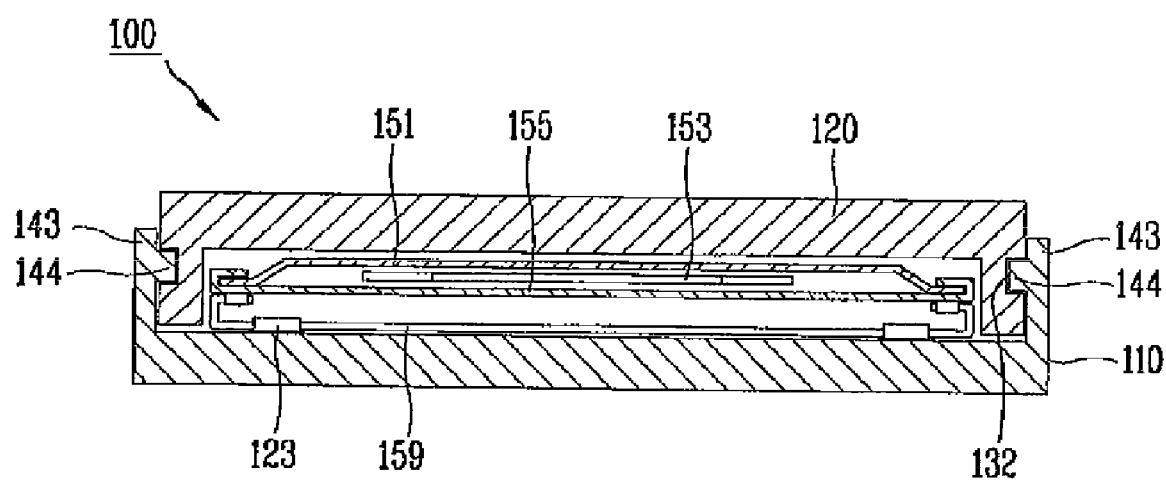
FIG. 4 is a sectional view taken along line IV-IV of the mobile terminal in FIG. 1.

FIG. 4 is a sectional view taken along line IV-IV of the mobile terminal in FIG. 1.

With reference to FIGS. 3 and 4, the guide unit 130 includes a pair of guide rails 131 formed at both sides of the lower body 120, first arm portions 141 formed at both sides of the upper body 110 and restrained to the first guide rails 131, second guide rails 132 formed at both sides of the upper body 110 and disposed in a crisscross manner with the first guide rails 131, and second arm portions 143 formed at both sides of the lower body 120 and restrained to the second guide rails 132.

The first guide rail 131 includes: a first horizontal portion 131a formed to be parallel to the first upper surface 121a of the lower body 120, a second horizontal portion 131b formed to be parallel to the second upper surface 121b of the lower body 120, and a slope portion 131c formed to be parallel to the slope face 121c of the lower body 120. The second guide rail 132 includes a counter first horizontal portion 132a, a counter second horizontal portion 132b and a counter slope portion 132c respectively corresponding to the first horizontal portion 131a, the second horizontal portion 131b and the slope portion 131c of the first guide rail 131.

The first and second guide rails 131 and 132 are formed to be opened in the lateral direction of the lower and upper bodies 120 and 110, respectively. A first slide protrusion 142 is formed on the first arm portion 141 and restrained to the first guide rail 131 and a second slide protrusion 144 is formed on the second arm portion 143 and restrained to the guide rail 132.

An elastic unit 150 includes a first slide member 151 fixed on a lower surface of the upper body 110, a second slide member 152 slidably restrained to the first slide member 151, a spring 153 having one end restrained to the first slide member 151 and the other end restrained to the second slide member 152, and deformed to provide an elastic force to the first slide member 151 while the first slide member 151 is moved, and a link member 159 having one end restrained to the upper surface of the lower body 120 and the other end restrained to the second slide member 152.

The upper body 110 and the lower body 120 are connected by a connection unit 160 which is moved or deformed in the direction of the upper body 110 when the upper body 110 is moved. The connection unit 160 may have the form of a cable or an FPCB (Flexible Printed Circuit Board).

With reference to FIGS. 3 and 4, the first slide member 151 may have a plate-like shape and the second slide member 152 may be formed at and covering both side ends of the first slide member 151 to allow slidable movement thereof. However, the structures of the first and second slide members 151 and 152 are not limited thereto and may be modified in various ways.

The spring 153 is installed such that it stores a restoring force when the upper body 110 is moved by a first distance L1 and then move the upper body 110 by virtue of the restoring force for a second distance L2 after the upper body 110 passes a dead point. The spring 153 as shown in FIG. 3 has a spiral shape, and the number or disposition of the springs can be employed variably. FIGS. 5B and 5D exemplarily show the first and second distances L1 and L2.

The link member 159 may be rotatably connected with the upper body 110 and the second slide member 152. With reference to FIG. 3, the link member 159 is rotatably supported by a rotation support 123 fixed on the lower body 120.

The link member 159 is formed to have a length allowing the link member 159 to be rotated within a range of an acute angle with respect to the upper surface of the upper body 110 while the upper body 110 is moved from the closed configuration to the open configuration, whereby when an appropriate is downwardly applied to the upper body 110, the upper body 110 can be easily slidably moved.

FIGS. 5A to 5D are side sectional views showing the process in which an upper body is moved with respect to a lower body according to an exemplary embodiment of the present invention.

Figure 5A:
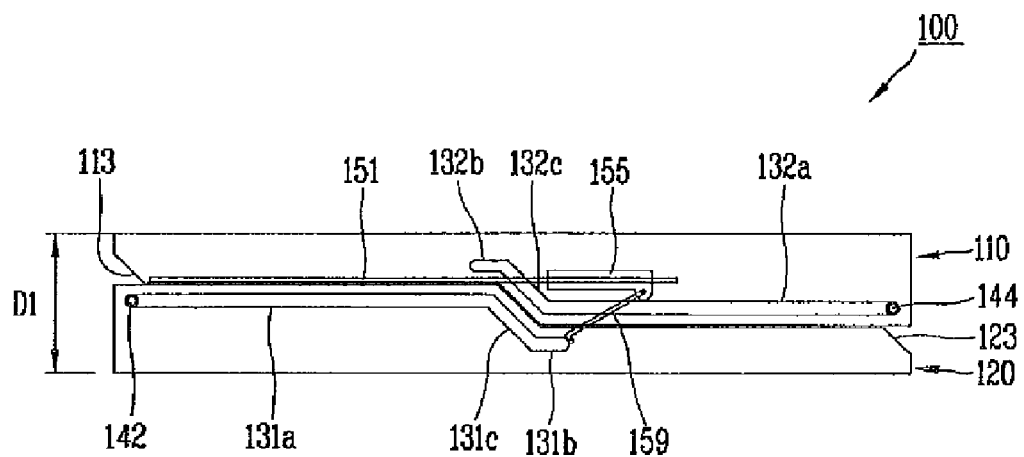
FIGS. 5A to 5D are side sectional views showing the process in which an upper body is moved with respect to a lower body according to an exemplary embodiment of the present invention.
Figure 5B:
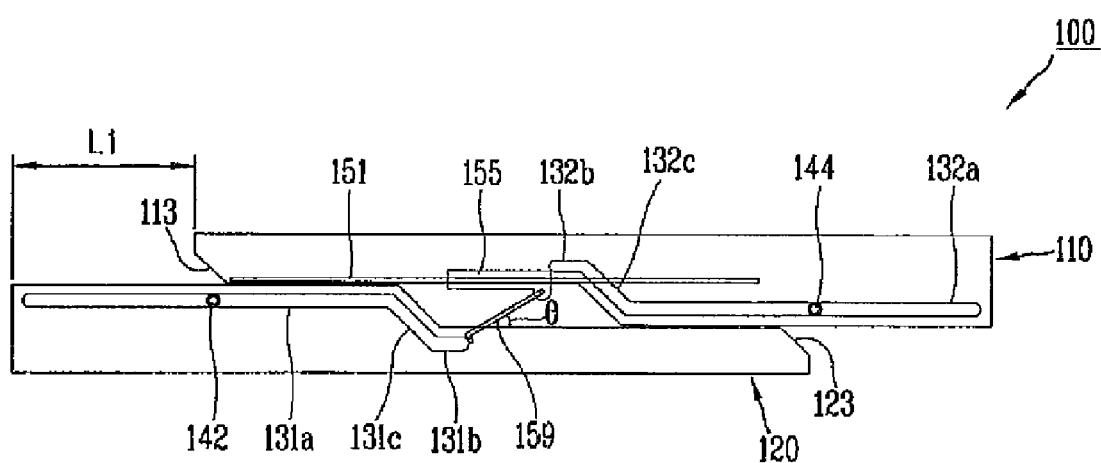

As shown in FIG. 5A, in the closed configuration in which the upper body 110 is completely folded on the lower body 120, the first slide protrusion 142 connected with the upper body 110 is positioned at a left end of the first horizontal portion 131a of the first guide rail 131 and the second slide protrusion 144 connected with the lower body 120 is positioned at a right end of the second guide rail 132.

While the upper body 110 is being moved in the planar direction by the first distance L1, a restoring force is stored in the spring 153 (See FIG. 5B).

Figure 5C:
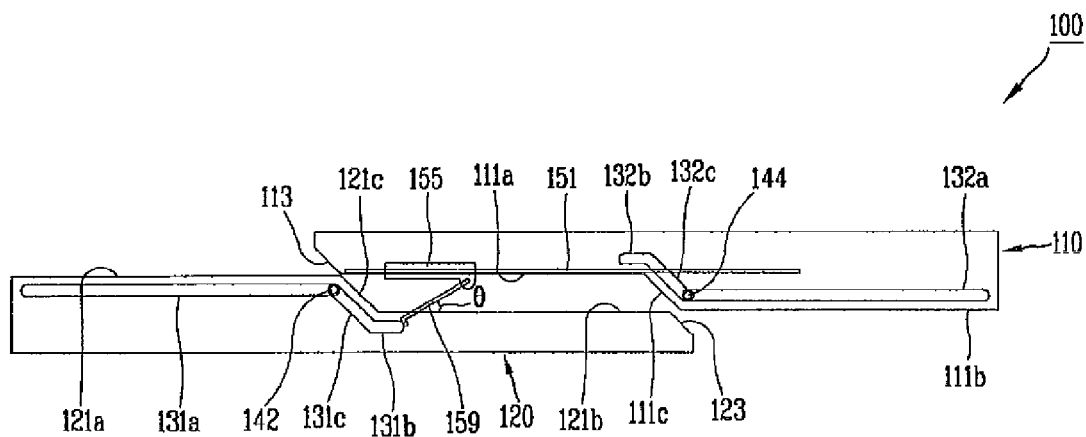
Figure 5D:
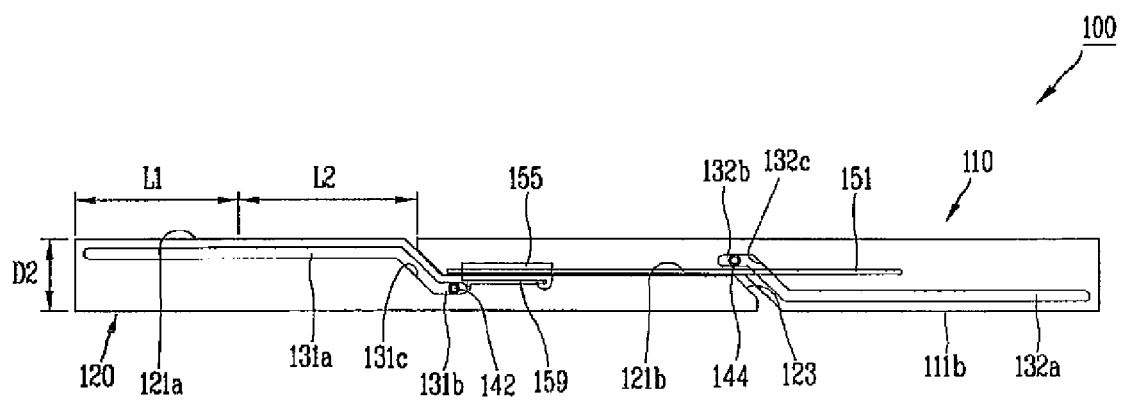

Thereafter, the upper body 110 continues to move in the planar direction by the restoring force of the spring 153 and then reaches a state in which the upper body 110 is at a position immediately before being lowered in a non-planar direction (that is, it is about to be lowered vertically) (See FIG. 5C). Up to this state, the positions of the second slide member 155 and the link member 159 are maintained, and the first slide protrusion 142 is positioned at the right end of the first horizontal portion 131a and the second slide protrusion 144 is positioned at the left end of the second guide rail 132.

In the state as shown in FIG. 5C, the horizontal force keeps working by the inertia of the upper body 110 and the restoring force of the spring, to force the first and second slide protrusions 142 and 144 to move along the slope portion 131c and the counter slope portion 132c. Accordingly, the upper body 110 is moved in the non-planar direction with respect to the lower body 120 and overlaps with the lower body 120 (See FIG. 8). In this process, in order to prevent the lower end of the upper body 110 from being interfered with by the slope face 121c of the lower body and the upper end of the lower body 120 from being interference with by the slop face 111c of the upper body 110, chambers 113 and 123 may be formed, respectively.

While the first an second slide protrusions 142 and 144 are moving along the slope portion 131c and the counter slope portion 1332c, respectively, the link member 159 is rotated within the range of an acute angle (θ) with respect to the second upper surface 121b of the lower body 120.

FIG. 5A to 5D show the case where the first and second slide protrusions 142 and 144 slidably contact with the first and second guide rails 131 and 132, respectively. But without being limited thereto, the first and second slide protrusions 142 and 144 may include rollers to contact with the first and second guide rails 131 and 132 in a rolling manner.

When the first slide protrusion 142 reaches the second horizontal portion 131a or the second slide protrusion 144 reaches the counter second horizontal portion 132a, the upper body 110 is opened with respect to the lower body 120.

In the state as shown in FIG. 5D, when an appropriate is applied to the upper body 110 in the opposite direction, the first and second slide protrusions 142 and 144 are restrained to the slope portion 131c of the first guide rail 131 and the slope portion 132c of the second guide rail 132, to move the upper body 210 in the planar and non-planar directions with respect to the lower body 220. Other movement process of the upper body 110 is in reverse order of the above description.

As mentioned above, when an appropriate force is applied to the upper body 110 to achieve a sliding movement with respect to the lower body 120, the upper body 110 is moved in a planar direction along the lower body 120 and then in a non-planar direction until the upper surfaces of the upper and lower bodies 110 and 120 are flush with each other.

Namely, it is noted that the mobile terminal 100 in FIG. 5A has the thickness D1 white the mobile terminal has the thickness D2, becoming thinner, in the open configuration as shown in FIG. 5D.

In addition, in the open configuration, advantageously, the upper and lower bodies 210 and 220 are combined to form a bar type mobile terminal.

Figure 6:
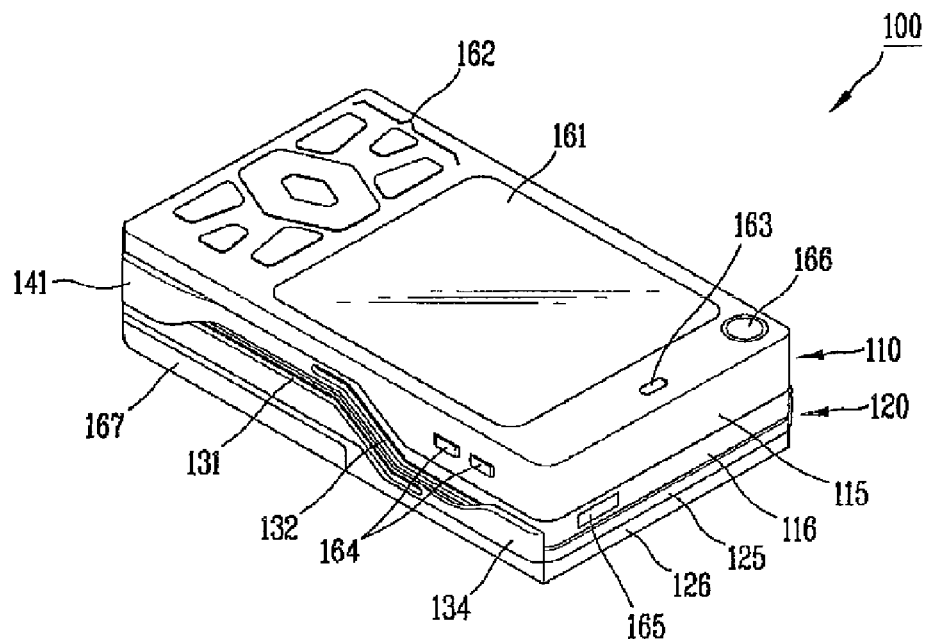
FIG. 6 is a front perspective view of a mobile terminal according to an exemplary embodiment of the present invention.
Figure 7:
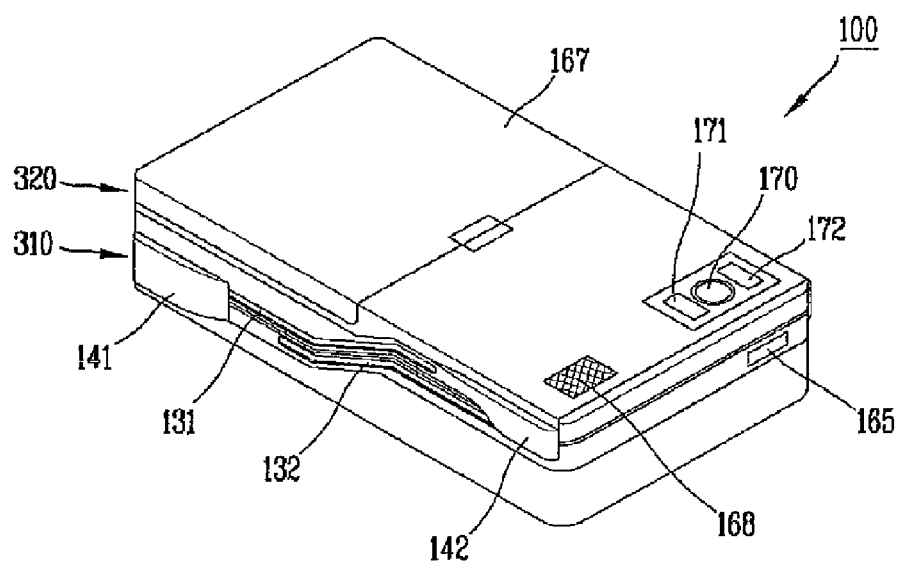
FIG. 7 is a lower perspective view of the mobile terminal in FIG. 6.

FIG. 6 is a front perspective view of a mobile terminal according to an exemplary embodiment of the present invention, and FIG. 7 is a lower perspective view of the mobile terminal in FIG. 6.

As shown in FIGS. 6 and 7, a case (i.e., a casing, a housing, or a cover, etc.) constituting the external appearance of the upper body 110 and the lower body 120 include front cases 115 and 125 and rear cases 116 and 126 that are combined to form a space in which various components are installed. At least one intermediate case can be additionally disposed between the front cases 115 and 125 and the rear cases 116 and 126. The cases 115, 125, 116, and 126 can be formed by injection-molding a resin or the like or can be made of a metallic plate material.

With reference to FIG. 6, on the upper surface of the upper body 110, there are disposed a display unit 161, a first audio output unit 14 that outputs audio information, a first image input unit 166 that inputs images, and a first manipulation unit 162 that inputs information.

The display unit 161 may be formed as an LCD (Liquid Crystal Display), an OLED (Organic Light Emitting Diode), or an e-paper, etc. Further, the display unit 13 may include a touch screen that allows inputting of information by user's touching.

The first manipulation unit 162 mainly receives a user instruction for controlling information displayed on the display unit 161. In detail, the first manipulation unit 162 may include keys for moving the direction of a pointer or a cursor displayed on the display unit 161 or keys for immediately executing particular functions.

The first audio output unit 163 may be implemented in the form of a receiver that allows listening to another party's conversation or in the form of a speaker that generates various music or alarm sounds.

The first image input unit 166 may have the form of a camera for capturing an image or video of the user and so on.

With reference to FIG. 7, a power supply unit 157 that supplies power to the mobile terminal 100, a second audio output unit 168 that outputs audible information, and a second image input unit 170 are provided on a lower surface of the lower body 120. A flash 171 and a mirror part 172 may be disposed near the second image input unit 170.

Figure 8:
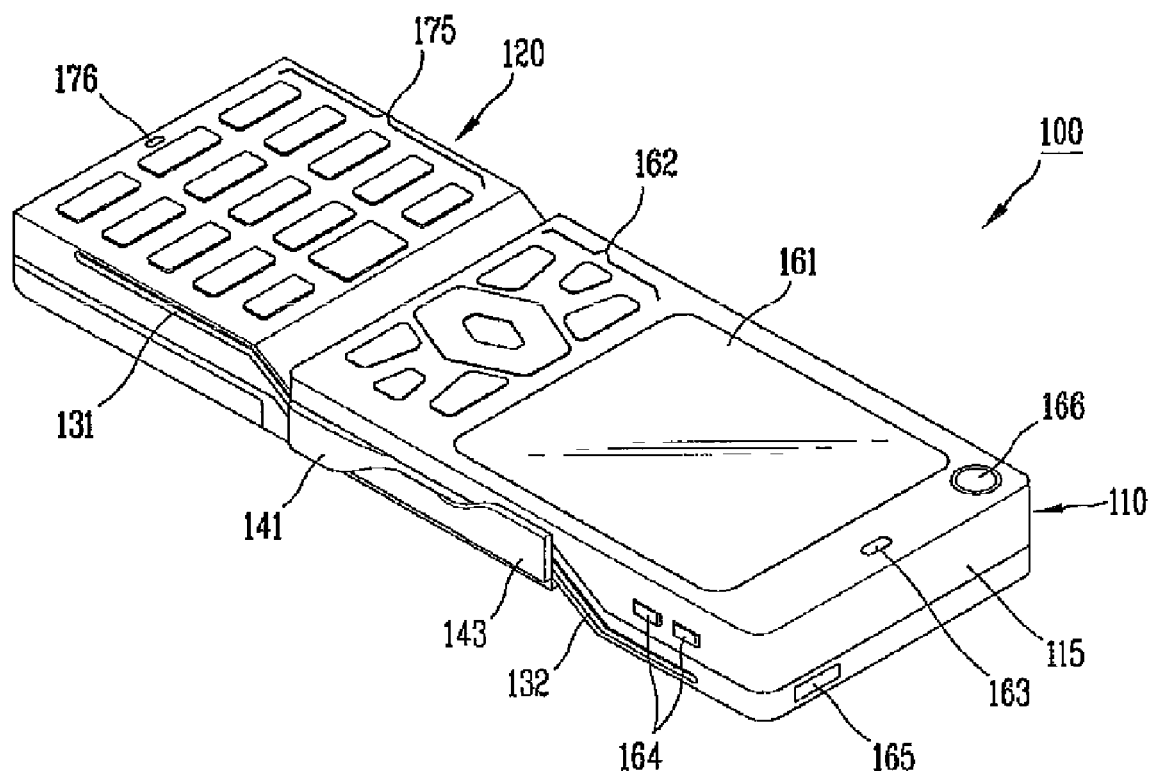
FIG. 8 is a front perspective view showing an open configuration of the mobile terminal in FIG. 6.

FIG. 8 is a front perspective view showing the open configuration of the mobile terminal in FIG. 6.

With reference to FIG. 8, the when the upper body 110 is opened with respect to the lower body 120, the upper surface of the upper body 110 and the upper surface of the lower body 120 exposed according to the movement of the upper body 110 are flush with each other, and the lower surface of the lower body 120 and the lower surface of the upper body 110 exposed according to the movement of the lower body 120 are flush with each other. Namely, in the open configuration, the mobile terminal 100 form a single bar type mobile terminal. Accordingly, although the upper body 110 is moved with respect to the lower body 120, a step is not formed therebetween.

A second manipulation unit 175 that inputs information may be disposed on a front surface of the front case 125 of the lower body 120. A third manipulation unit 165 and an external interface 165 may be disposed on at least one of the front case 115 or the rear case 116 of the upper body 110.

The first to third manipulation units 162, 175, and 164 may be generally called a manipulation part, and may be implemented in any type of method so long as a user can manipulate it in a tactile manner. For example, the manipulation units 162, 175 and 164 may be implemented in the form of a dome switch, a touch screen or a touch pad that receives an instruction (command) or information in a push or touch manipulation by the user, or may be implemented in the manner of rotating a key or perform manipulation like a joystick. The instruction or information inputted by the manipulating units 162, 175, and 164 may include numbers, a language of at least one country, a scroll direction, start, end, etc.

In terms of function, the first manipulation unit 162 inputs a command such as start, end and scrolling, etc., and the second manipulation unit 175 inputs numbers, characters or symbols. The third manipulation unit 164 may operate as a hot key for performing a special function such as activating of the first image input unit 166.

The first audio input unit 176 may be implemented in the form of, for example, a microphone in order to receive a voice of the user or other sounds.

As shown in FIG. 6, in the closed configuration in which the upper body 110 completely overlaps with the lower body 120, the mobile terminal mainly operates in a standby mode, and in the open configuration in which the upper body 110 exposes at least a portion of the lower body 120 as shown in FIG. 8, the mobile terminal operates in a call mode or in an editing mode.

The external interface unit 165 may be used as a link (passage or path) through which the terminal can exchange data or the like with an external device.

For example, the external interface unit 165 may be implemented as one of a connection port for connecting an earphone to the mobile terminal via a fixed line or wireless means, a port for short-range communications (e.g., an Infrared Data Association (IrDA) port, a Bluetooth™ port, a wireless LAN port, etc.), power supply ports for providing power to mobile terminal, or the like.

The external interface unit 165 may be a card socket for accommodating an external card, such as a Subscriber Identity Module (SIM), a User Identity Module (UIM), a memory card for storing information, or the like.

The second audio output unit 168 may implement a stereophonic function in conjunction with the first audio output unit 163 and may be used for call communication in a speaker phone mode.

In the above description, the second image input unit 170 and the like is disposed on the lower body 120, but such configuration is not meant to be limited. For example, one or more of the elements such as the second image input unit 170 or the like which are disposed on the rear case 126 in the above description may be mounted on the lower surface of the upper body 110. In this case, those elements disposed on the rear case 116 can be protected (or covered) by the lower body 120 in the closed configuration. In addition, even if the second image input unit 170 is not provided, the first input image unit 166 may be configured to rotate (or otherwise be moved) to thus allow image capturing in various directions.

With such a configuration, the mobile terminal 100 has the opening and closing mechanism as shown in FIGS. 5A to 5D, whereby the mobile terminal can have the sufficiently small size in the closed configuration. In addition, when the mobile terminal 100 is open, the upper body 110 overlaps with the lower body 120 in the non-planar direction, making the first manipulation unit 162 and the display unit 161 of the upper body 110 are flush with the second manipulation unit 175 of the lower body 120, accomplishing a stable structure in its external appearance and being easily used.

Regarding such shifting to the opened configuration, when the upper body 110 is moved for the first distance L1 by means of the elastic unit 150 that connects the upper and lower bodies 110 and 120, the upper body 110 is then moved in a "semi-automatic" manner up to the second distance L2 by virtue of the restoring force of the spring 153.

As described above, according to the mobile terminal of the present invention, when an appropriate force is applied to the upper body to achieve a sliding movement with respect to the lower body, the upper body can be moved in a planar direction along the lower body and then in a non-planar direction until the upper surfaces of the upper and lower bodies are flush with each other, such that a bar type configuration can be achieved in the open configuration, as can be understood with respect to the attached figures.

In another aspect of the present invention, the elastic unit can provide an elastic force to the upper body when the upper body is moved with respect to the lower body, facilitating the opening and closing operation.

Figure 9:
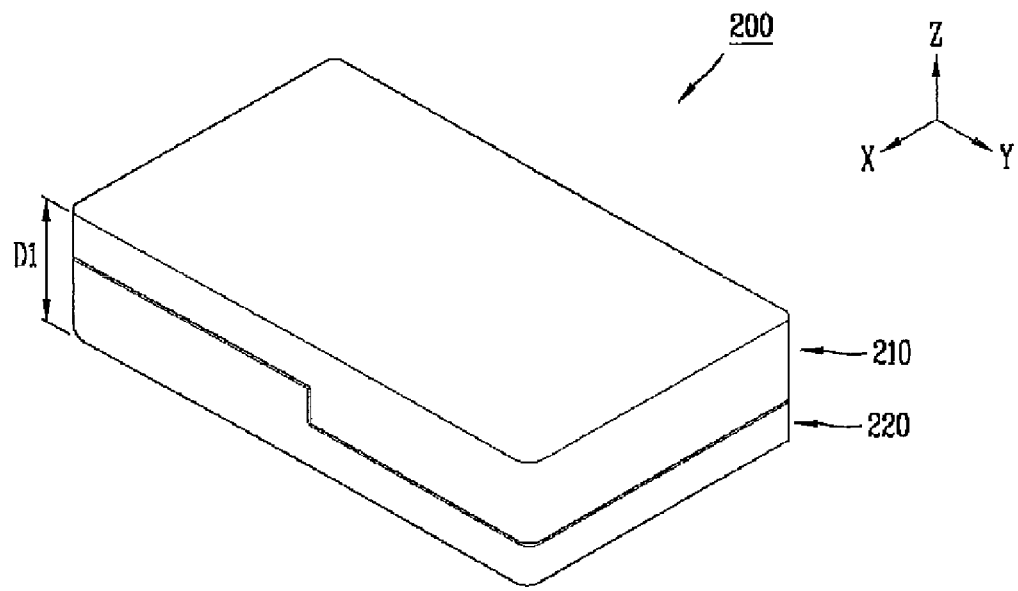
FIG. 9 is a front perspective view of a mobile terminal according to another exemplary embodiment of the present invention.
Figure 10:
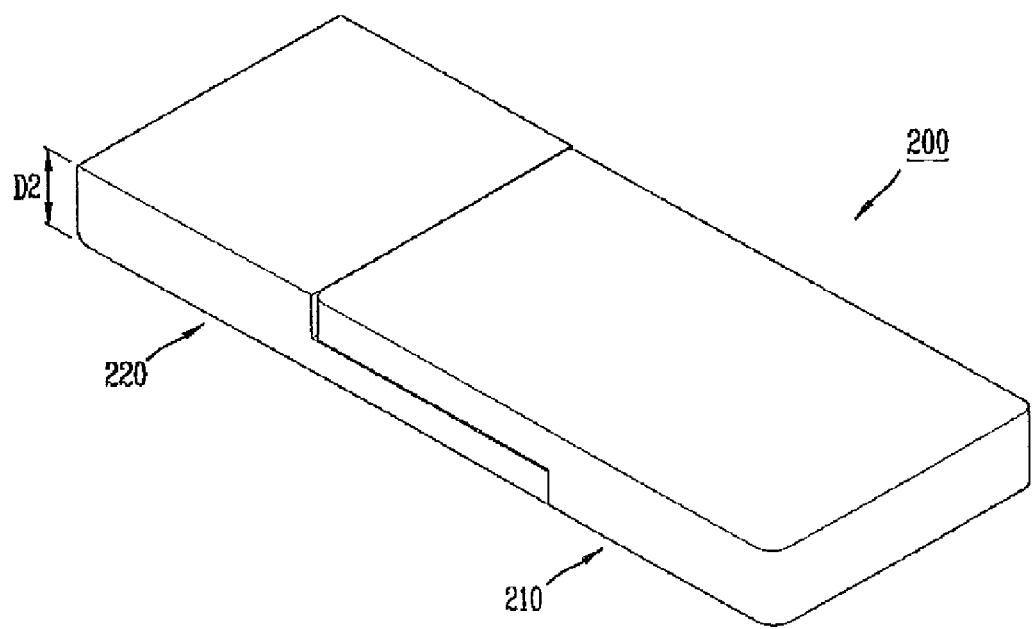
FIG. 10 is a front perspective view showing an open configuration of the mobile terminal in FIG. 9.

FIG. 9 is a front perspective view of a mobile terminal according to another exemplary embodiment of the present invention, and FIG. 10 is a front perspective view showing an open configuration of the mobile terminal in FIG. 9.

As shown in FIGS. 9 and 10, a mobile terminal 200 includes an upper body 210 and a lower body 220 that are combined to be movable to each other. Although the mobile terminal 200 are in an open configuration as shown in FIG. 10, the shape or structure of the terminal 200 is not seen unlike the mobile terminal as shown in FIGS. 1 to 8. Namely, in FIG. 10, when the upper body 210 is opened with respect to the lower body 220, an upper surface of the upper body 210 and an upper surface of the lower body 220 exposed according to a movement of the upper body 210 are flush with each other. Accordingly, because the upper body 210 is moved in the planar and non-planar directions with respect to the lower body 220, degradation of the usability and aesthetic appearance of the mobile terminal that may be caused as the upper surface of the upper body 210 makes a step to be higher than that of the lower body 220 can be prevented.

Figure 11:
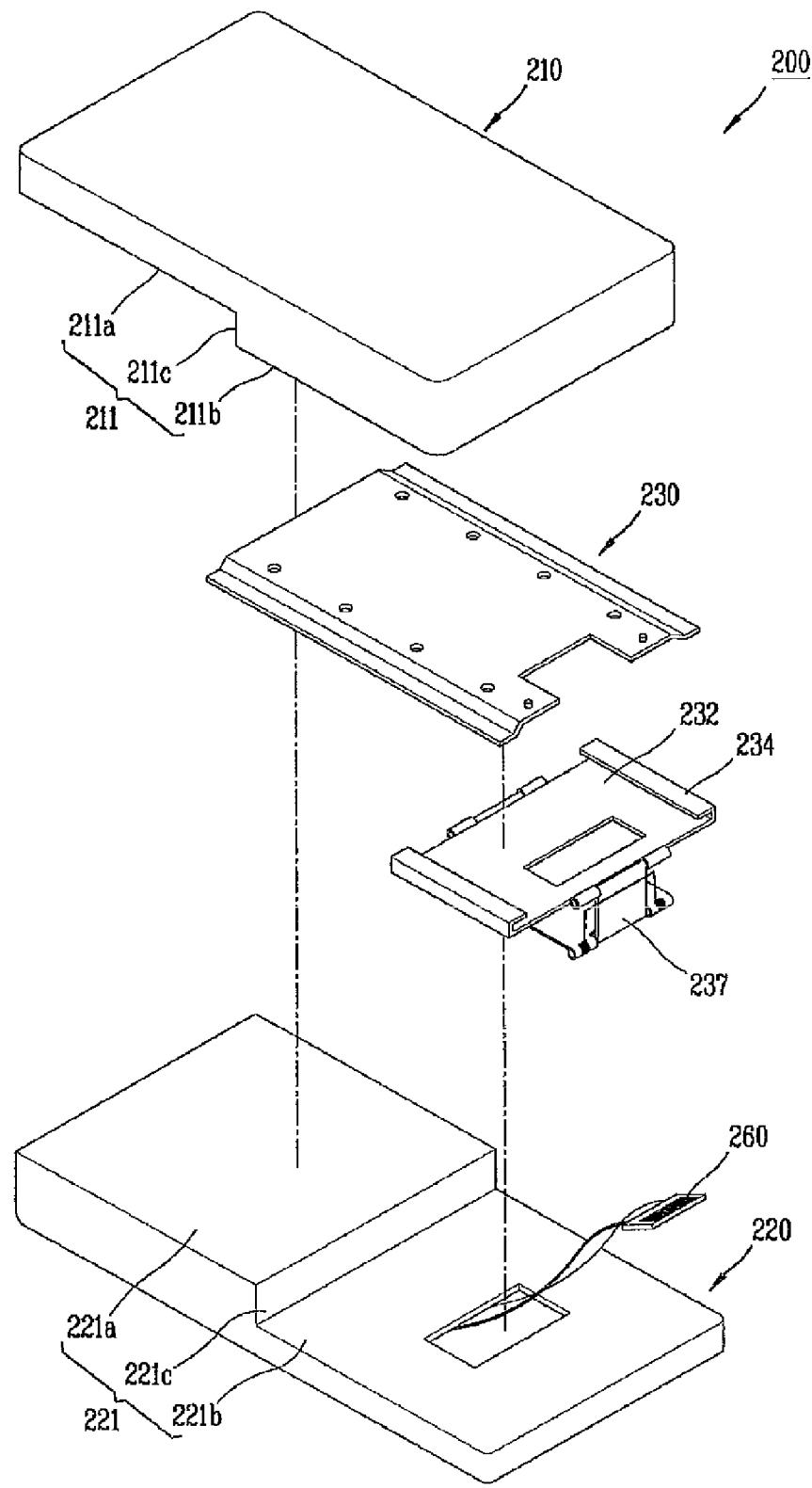
FIG. 11 is an exploded perspective view of the mobile terminal in FIG. 9.
Figure 12:
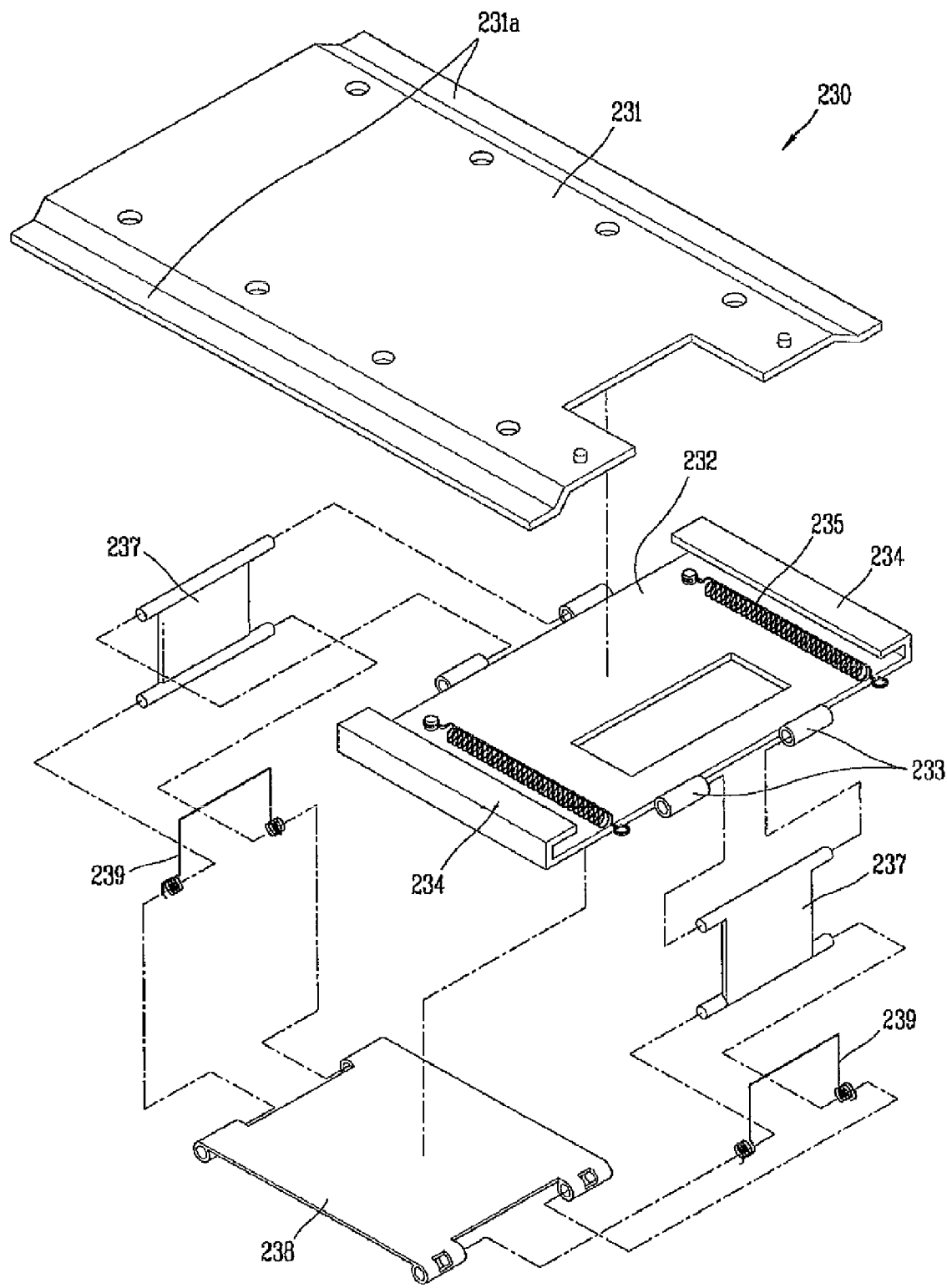
FIG. 12 is an exploded perspective view of an operating module of FIG. 11.

FIG. 11 is an exploded perspective view of the mobile terminal in FIG. 9, and FIG. 12 is an exploded perspective view of an operating module of FIG. 11.

As shown in FIG. 11, an upper surface 221 of the lower body 220 includes a first upper surface 221a exposed when the upper body 210 is in an open configuration, a second upper surface 221b which is lower than the first upper surface 221a and is not exposed when the upper body 210 is in the open configuration, and an intermediate face 221c connecting the first and second upper surfaces 221a and 221b.

A lower surface 211 of the upper body 210 includes a first lower surface 211a, a second lower surface 111c, and a counter intermediate face 211c formed to have the reverse configuration to correspond to the first upper surface 221a, the second upper surface 221b and the intermediate face 221c of the lower body 220.

The upper body 210 and the lower body 220 may be formed to be antiparallel with each other. In this case, the length of the upper body 210 may be shorter than that of the lower body 220, whereby even when the upper body is in the closed configuration, at least the first upper surface 221a of the lower body 220 can be exposed on which a convenience function or a manipulation unit may be disposed.

An operating module 230 is provided between the upper and lower bodies 210 and 220 in order to lock the upper body such that when an appropriate force is applied to the upper body to achieve a sliding movement with respect to the lower body, the upper body is moved in a planar direction along the lower body and then in a non-planar direction to make an open configuration, and that returns the upper body to a closed configuration when the locking state is released.

As shown in FIG. 12, the operating module 230 includes a fixed member 231, a guide member 232, and a link member 237.

The fixed member 231 is fixed to a lower surface of the upper body 210 so as to be integrally moved with the upper when 210 during movement.

The guide member 232 serves to guide the fixed member 231 to be moved horizontally. The fixed member 231 and the guide member 232 may be formed as a metal panel or have a plate-like shape, and in this case, the thickness of the mobile terminal can be reduced. For example, as shown in FIG. 12, the guide member 232 may be formed to cover both side ends 231a of the fixed member 231. A lubricating member may be provided between the both side ends 231 of the fixed member 231 and the guide member 232 in order to reduce a frictional contact between the fixed member 231 and the guide member 232 when the fixed member 231 is slidably moved along the guide member 232.

A first spring 235 is provided between the fixed member 231 and the guide member 232 in order to apply a restoring force in the direction that the guide member 232 goes toward the closed configuration.

The first spring 235 stores restoration energy while the fixed member 231 is moved with respect to the guide member 232 from the closed configuration to the open configuration. In detail, the first spring 235 may be installed such that its the restoration energy is retained (or stored) while the fixed member 231 is moved in the planar direction for a certain distance with respect to the guide member 232, and after the fixed member 231 has been moved by more than the distance, the fixed member 231 is moved for the remaining distance by the restoration force of the first spring 235 (See FIGS. 15A to 15C).

The first spring 235 may have various examples in its structure, and in FIG. 12, a tensile spring is used. Besides, as the first spring 235, a spiral spring or a plate spring can be used. The number of first springs 235 can be adjusted according to the size of restoration force.

One end of the link member 237 is rotatably supported by the guide member 232 and the other end of the link member 237 is rotatably supported by the upper surface of the lower body 220. The link member 237 moves the fixed member 231 and the guide member 232 in a vertical direction. Namely, when the upper body 210 is moved in a planar direction so as to be positioned to move in a non-planar direction, the link member 237 converts a horizontal force applied to the upper body 210 into a movement in a non-planar direction. The link member 237 may be formed as a simple link with both ends rotatably coupled.

The link member 237 is formed as a pair such that they are spaced apart at a certain distance in the movement direction of the lower body 220, whereby when the upper body 210 is moved in the non-planar direction with respect to the lower body 220, the upper body 210 may be moved in a parallel manner without being inclined. The total number of link members 237 to be used is not limited, and implementations using a combination of a greater number of link members are possible.

While the guide member 232 is being rotated by the link member 237, a horizontal movement between the guide member 232 and the link member 231 may be simultaneously performed with a vertical movement.

A lower end of the link member 237 may be formed to be rotatably supported by a fixed plate 238.

The fixed member 231, the guide member 232, the link member 237 and the fixed plate 238 may be combined to be fabricated as a single module, and in this case, the assembling of the mobile terminal can be facilitated.

A second spring 239 may be installed between the link member 237 and the lower body 220 in order to apply a restoration force in the direction that the upper body 210 is lifted.

The second sprig 239 serves to preferentially lift the upper body 210 with respect to the lower body 220 to return the upper body 210 when the upper body 210 overlaps with the lower body 220 in a non-planar manner so as to be in the open configuration, to thus facilitate the movement of the upper body 210 in the planar direction.

The second spring 239 may be implemented in various forms. As shown in FIG. 12, the second spring 239 is formed as a torsion spring. Besides, as the second spring 239, a tension/compression spring or a plate spring can be used. The number of the second springs 239 may be adjusted according to the size of the restoration force.

The upper body 210 and the lower body 220 are connected by a connection unit 260 which is moved or deformed in the direction of the upper body 110 when the upper body 110 is moved. The connection unit 260 may have the form of a cable or an FPCB (Flexible Printed Circuit Board).

FIGS. 13A to 13D are schematic side sectional views showing the process in which the upper body is moved with respect to the lower body according to an exemplary embodiment of the present invention.

As shown, the mobile terminal 200 may include locking portions 251 to 254 formed on the upper and lower bodies 210 and 220 in order to lock the upper body 210 when the fixed member 231 and the guide member 232 are moved in a non-planar direction by the link member 237.

The locking portions 251 to 254 refer to stop protrusions 251 and 253 formed to be protruded from one side of the upper body 210 and stop recesses 252 and 254 allowing the stop protrusions 251 and 253 to be caught therein when the upper body 210 is in the open configuration.

The stop protrusions 251 and 253 and the stop recesses 252 and 254 may be formed to meet when the upper body 210 is open with respect to the lower body 220, and as shown in FIGS. 13A to 13D, they may be formed at a plurality of positions so as to be coupled when the mobile terminal 200 is in the closed configuration and in the open configuration. Unlike the configuration as shown in the drawings, the stop protrusions may be formed on the lower surface of the upper body 210 and the stop recesses may be formed on the upper surface of the lower body 220. In addition, the stop protrusions may be formed on the lower body 220 and the stop recesses may be formed on the upper body 210. Besides the protruded and depressed configuration of the stop protrusions and the stop recesses, the stop protrusions 251 and 253 and the stop recesses 252 and 254 may have such a structure that they are hooked.

The operation of the upper body 210 and the lower body 220 constructed as described above will now be described with reference to FIGS. 13A to 13D.

Figure 13A:
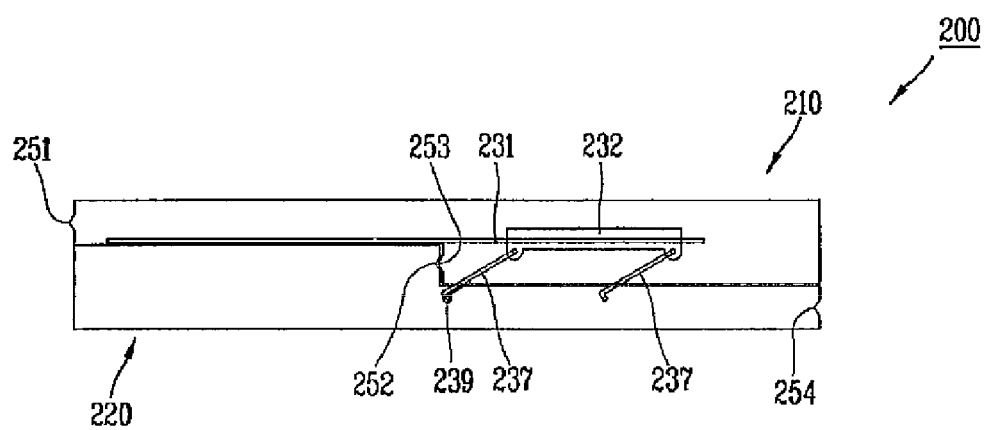
FIGS. 13A to 13D are schematic side sectional views showing the process in which an upper body is moved with respect to a lower body according to an exemplary embodiment of the present invention.

As shown in FIG. 13A, in the state that the upper body 210 completely overlaps with the lower body 220, the guide member 232 is positioned at a right end portion of the fixed member 231. The fixed member 231 and the guide member 232 are connected such that an elastic force of the first sprig 235 can be applied thereto.

Figure 13B:
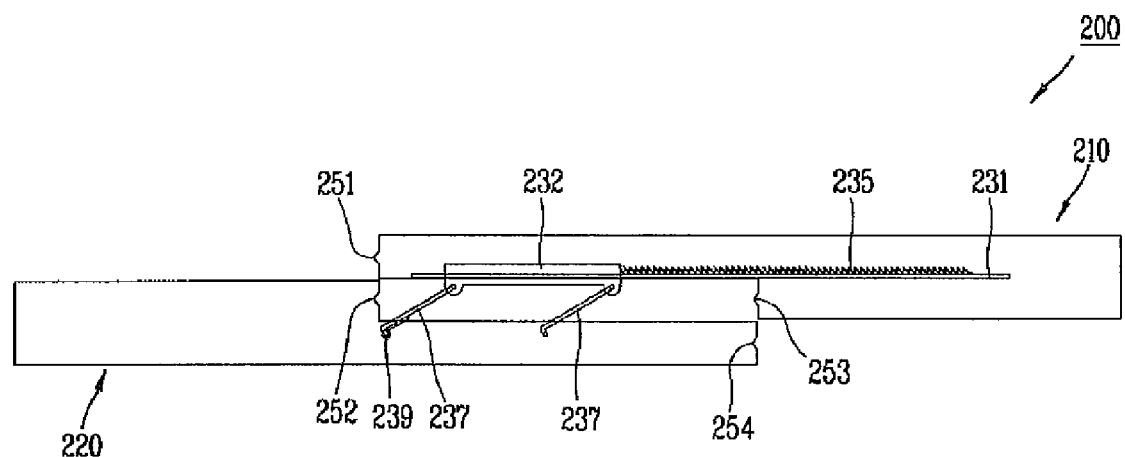

When an appropriate force is applied to the upper body 210 in the planar direction, as shown in FIG. 13B, the guide member 232 is slidably moved until it reaches a left end portion of the fixed member 231. In this process, a restoration energy is stored in the first spring 235.

When an appropriate force is applied to the upper body 210 in the state as shown in FIG. 13B, the fixed member 231 does not slidably move any further along the guide member 232, but parallely move in the planar and then non-planar directions according to the rotation of the link member 237. In this process, a restoring force is stored in the second sprig 239.

Figure 13C:
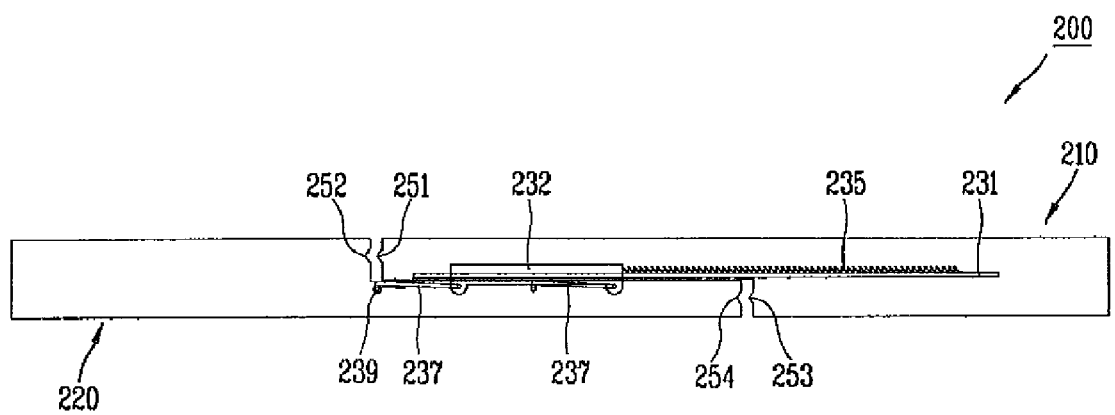

The movement of the upper body in the non-planar direction is stopped in the state as shown in FIG. 13C in which the lower surface of the upper body 210 is in contact with the upper surface of the lower body 220. When the upper body 210 is moved with respect to the lower body 220 in the planar and non-planar manner, the link member 259 is rotated within a certain angle range with respect to the upper surface of the lower body 220.

When the upper body 210 is slidably moved in the planar direction and then moved in the non-planar direction with respect to the lower body (See FIG. 13C), the fixed member 231 and the upper body 210 are slightly retrieved by the restoring force of the first spring 235. Accordingly, the stop protrusions 251 and 253 are caught in the stop recesses 252 and 254, so even if the restoring force of the second spring 239 works, the upper body 210 is maintained to be opened (See FIG. 13D).

Figure 13D:
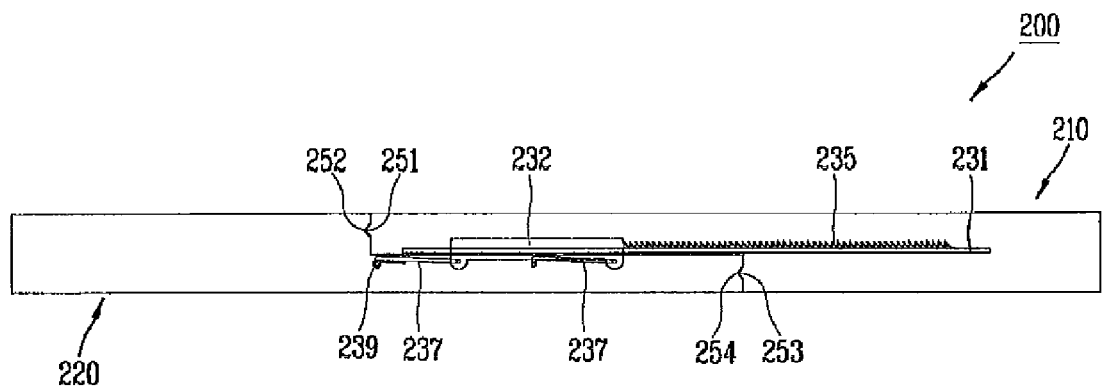

In the state as shown in FIG. 13D, when the upper body 210 is slightly moved in the planar direction, the stop protrusions 251 and 253 are released from the stop recesses 252 and 254 and the upper body 210 is lifted by the restoring force of the second spring 239.

When the upper body 210 is lifted with a sufficient height with respect to the lower body 220, the upper body 210 is moved in the planar direction by the restoring force of the first spring 235 toward the closed configuration. In this case, in order to reduce such a phenomenon that the upper body 210 is accelerated by the first sprig 235, a speed reduction unit may be provided between the upper body 210 and the lower body 220.

In the present exemplary embodiment, when an appropriate force is applied to the upper body 210 in the planar direction with respect to the lower body 220 by the operating unit 230, the upper body 210 is moved in the non-planar direction to overlap with the lower body 220 in the vertical direction. Like the first exemplary embodiment, the upper surfaces of the upper and lower bodies 210 and 220 can be flush with each other. In addition, the upper and lower bodies 210 and 220 may be combined in the open configuration to achieve a bar type mobile terminal.

Figure 14:
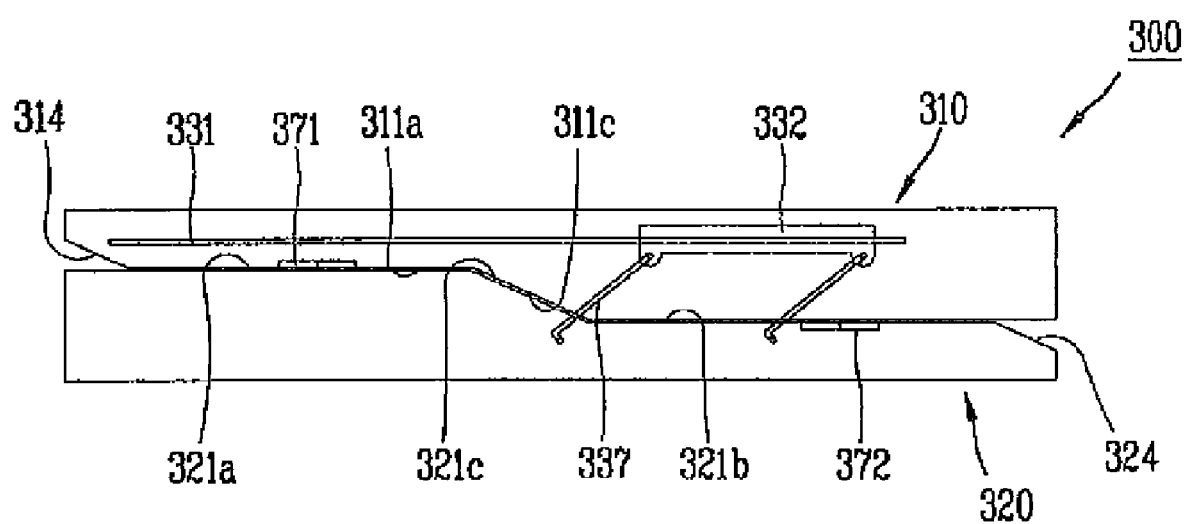
FIG. 14 is a schematic side sectional view of a mobile terminal according to still another exemplary embodiment of the present invention.

FIG. 14 is a schematic side sectional view of a mobile terminal according to still another exemplary embodiment of the present invention. As shown in FIG. 14, a mobile terminal 300 includes an upper body 310 and a lower body 320. A lower surface of the upper body 310 has a slope face 311c formed to be sloped and an upper surface of the lower body 320 has a slope face 321c formed to be sloped.

Locking units 371 and 372 are provided on the lower surface of the upper body 310 and the upper surface of the lower body 320 to maintain an open configuration of the upper body 310 when the upper body 310 overlaps in a non-planar manner with respect to the lower body 320 in the open configuration. The locking units 371 and 372 refer to a first magnet unit 371 disposed on the lower surface of the upper body 310 and the second magnet unit 372 disposed to maintain the open configuration by attraction with the first magnet unit 371 when the upper body 310 is in the open configuration and disposed to push the upper body 310 in the non-planar direction by repulsion with the first magnet unit 371 when the upper body 310 is moved for a certain distance. For this purpose, the is first and second magnet units 371 and 372 may be disposed to be parallel to each other.

Figure 15A:
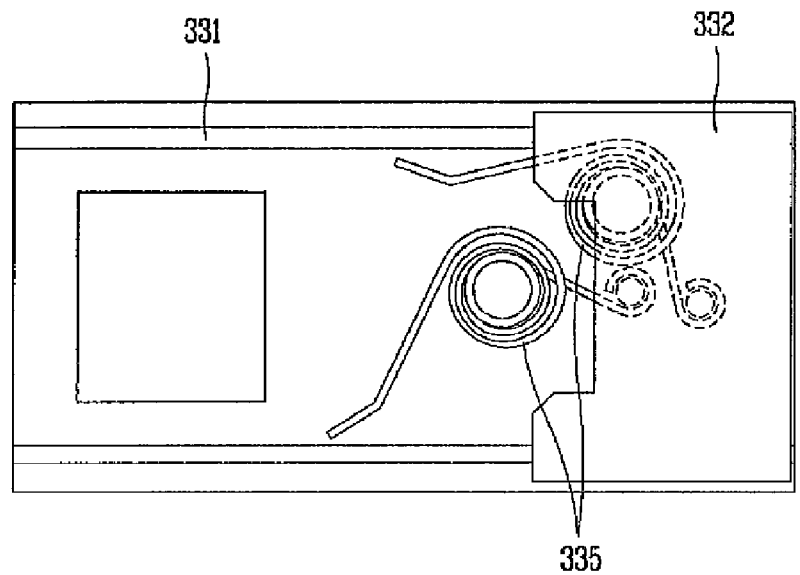
FIGS. 15A to 15C are plan views showing a horizontal operational state of an operating module installed in the mobile terminal in FIG. 14.
Figure 15B:
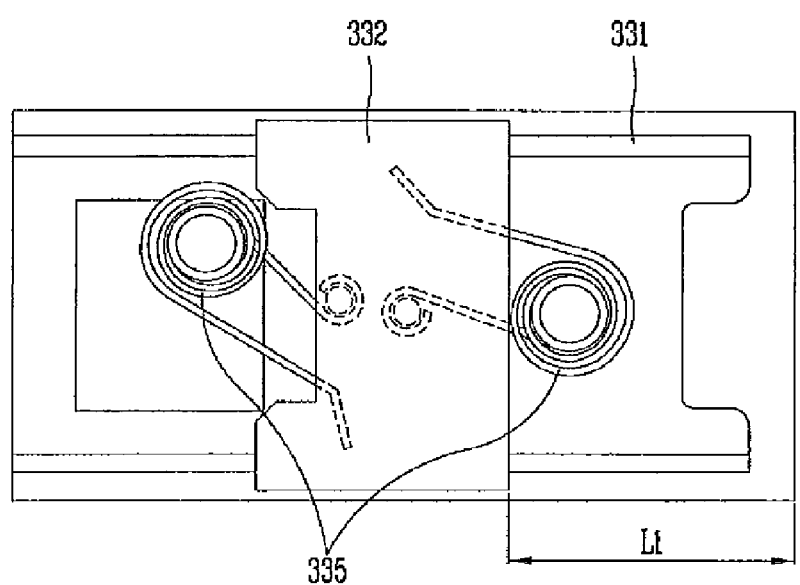
Figure 15C:
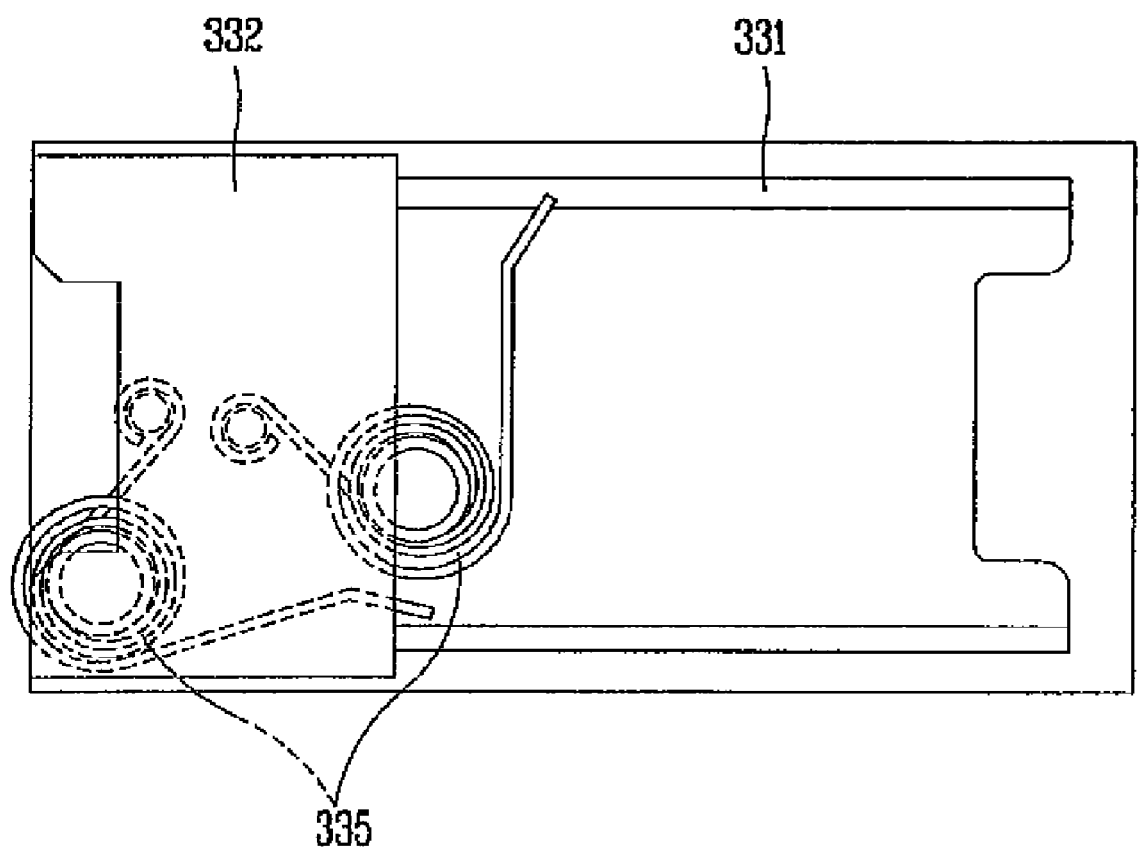

FIGS. 15A to 15C are plan views showing a horizontal operational state of an operating module installed in the mobile terminal in FIG. 14.

As shown in FIG. 15A, a fixed member 331 of an operating module 330 is fixed in the upper body 310, and a guide member 332 guides a horizontal movement of the fixed member 331.

A spring 335 installed between the fixed member 331 and the guide member 332 may be installed such that its the restoration energy is retained (or stored) while fixed member 331 is moved in the planar direction for a first distance L1 with respect to the guide member 332 in the closed configuration of the upper body 310, and after the fixed member 331 has been moved by more than the first distance, the fixed member e31 is moved for the remaining distance by the restoration force of the spring 335.

Accordingly, in the state as shown in FIG. 15A, when the fixed member 331 is slidably moved for the first distance L1 with respect to the guide member 332, the configuration (state) as shown in FIG. 15B is achieved, and in such state, the fixed member 331 can be moved for the remaining distance by the restoring force of the spring 335 in order to pen the upper body 310 without the necessity of applying a force in the planar direction.

Figure 16A:
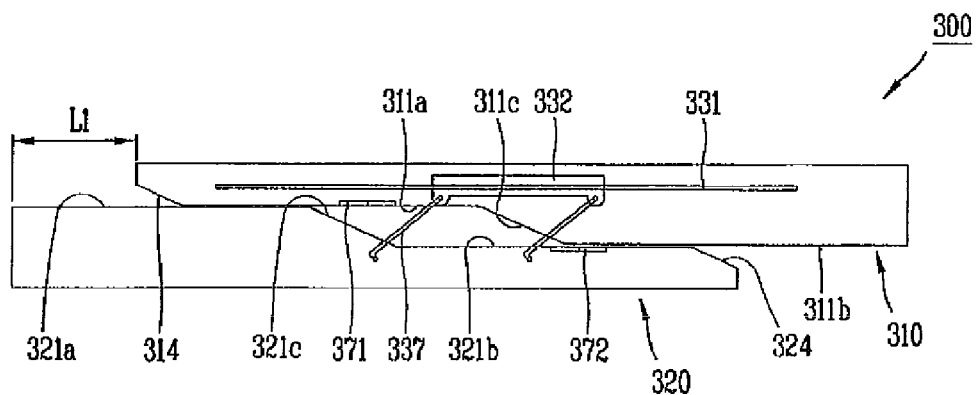
FIGS. 16A to 16C are views showing a process in which the mobile terminal in FIG. 14 is open.
Figure 16B:
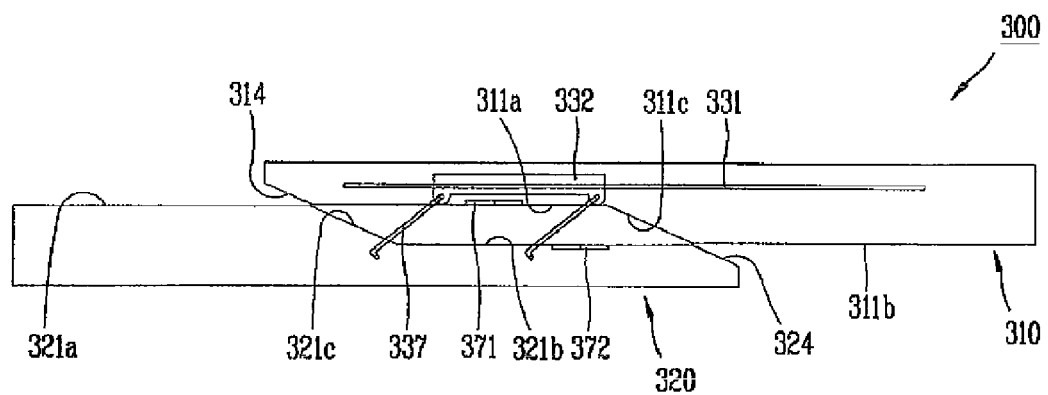
Figure 16C:
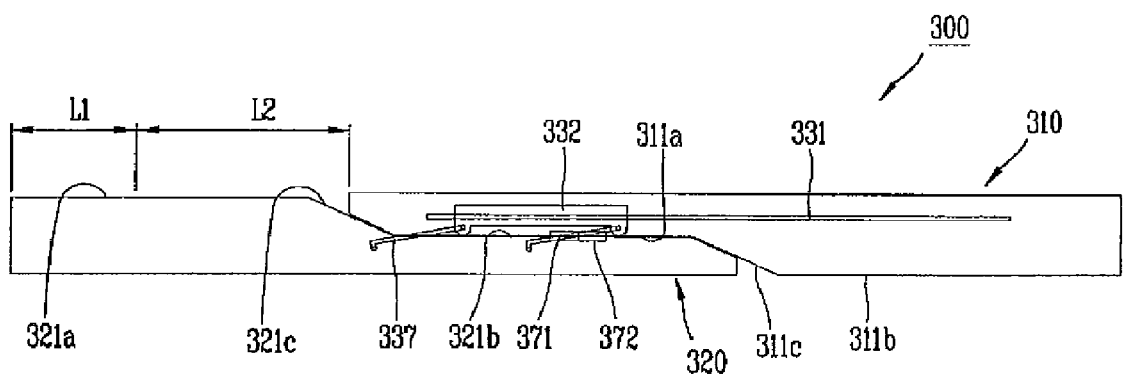

FIGS. 16A to 16C are views showing a process in which the mobile terminal in FIG. 14 is open.

As shown in FIG. 16A, when the upper body 310 is slidably moved by applying an appropriate force thereto in the planar direction for the first distance L1 with respect to the lower body 320, a restoring force is stored in the spring 335 positioned between the upper body 310 and the lower body 320.

In the state as shown in FIG. 16A, although the force applied to the upper body 310 in the planar direction is removed, the upper body 310 can be moved by the restoring force of the sprig 335 for a second distance L2, namely, the remaining distance. When an end of the upper body 310 reaches the slope face 321c of the lower body 320, the upper body 310 starts to overlap with the lower body 320 in the non-planar (e.g. perpendicular) direction according to the action of the link member 337 (See FIG. 16B).

With reference to FIG. 16A, a chamfer 314 may be formed at a lower end of the upper body 310 in order to prevent the lower end of the upper body 310 from being interfered with by the slope face 321c of the lower body 320 when the upper body 310 overlaps with the lower body 320 in the non-planar direction. Likewise, a chamfer 324 may be formed at an upper end of the lower body 320 in order to prevent the upper end of the lower body 320 from being interfered with by the slope face 311c of the upper body 310.

As the upper body 310 overlaps with the lower body 320 in the non-planar (e.g. perpendicular) direction, the first magnet 371 installed at the upper body 310 and the second magnet unit 372 installed at the lower body 320 approach each other and magnetic attraction therebetween occurs. Accordingly, the lower surface of the upper body 310 is tightly attached to the upper surface of the lower body 320 to implement the open configuration, and this state is maintained by the magnetic attraction between the first and second magnet units 371 and 372 (See FIG. 16C).

In the state as shown in FIG. 16, when an appropriate force is applied to the upper body 310 with respect to the lower body 320 in the planar direction, the first magnet unit 371 of the upper body 310 and the second magnet unit 372 of the lower body 320 are positioned in a crisscross manner, between which repulsion works. The repulsion between the first and second magnets 371 and 372 serve to push up the upper body 310 in the non-planar direction with respect to the lower body 320. Accordingly, the first and second magnet units 371 and 372 have the advantage of reducing the force for pushing to close the upper body 310 in addition to the function of maintaining the open state of the upper body 310 with respect to the lower body 320.

Figure 17:
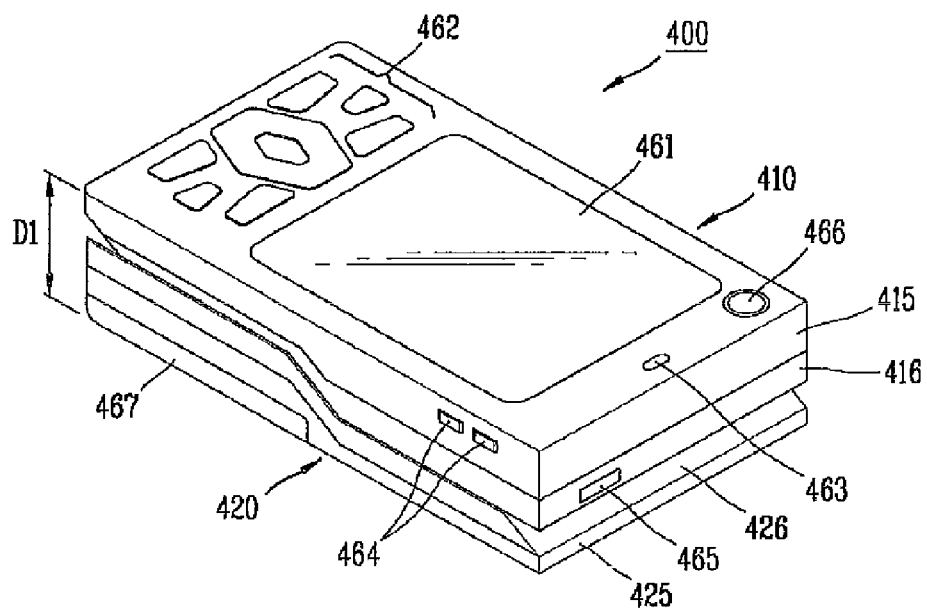
FIG. 17 is a front perspective view of the mobile terminal according to an exemplary embodiment of the present invention.

FIG. 17 is a front perspective view of the mobile terminal according to an exemplary embodiment of the present invention. As shown in FIG. 14, a mobile terminal, and FIG. 18 is a rear perspective view of the mobile terminal in FIG. 17.

Figure 18:
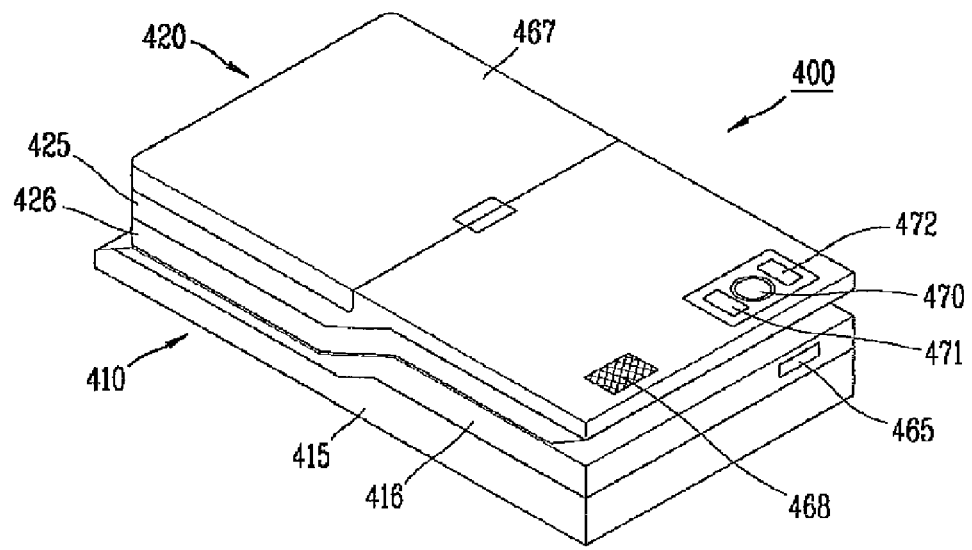
FIG. 18 is a rear perspective view of the mobile terminal in FIG. 17.

As shown in FIGS. 17 and 18, a case (housing, casing, cover, etc.) constituting the external appearance of the upper body 410 and the lower body 420 comprises front cases 415 and 425 and rear cases 416 and 426 that are combined to form a space in which various components may be installed. At least one intermediate case may be additionally disposed between the front cases 415 and 425 and the rear cases 416 and 426. Here, the cases may be formed by injection-molding a resin, or made of a metallic material.

As shown in FIG. 17, a display unit 461, a first audio output unit 463 that output audio signals, a first image input unit 466 that inputs images, and a first manipulation unit 462 that inputs information are provided on the upper surface of the upper body 410.

The display unit 461 may include a Liquid Crystal Display (LCD), an Organic Light Emitting Diode (OLED), an e-paper, and the like. In addition, the display unit 461 may further include a touch screen to input information by a user's touch.

The first manipulation unit 462 may receive a user instruction for controlling information displayed on the display unit 461. In detail, the first manipulation unit 462 may include keys for moving the direction of a pointer or a cursor displayed on the display unit 461 or keys for immediately executing particular functions.

The first audio output unit 463 may be implemented as a receiver that allows listening to another party's conversation or in the form of a speaker that generates various music or alarm sounds. The first image input unit 466 may have the form of a camera for capturing an image or video of the user and so on.

As shown in FIG. 18, a power supply unit 467 that supplies power to the mobile terminal 400, a second audio output unit 468 that outputs audio signals, and a second image input unit 470 that inputs images are provided on the lower surface of the lower body 420.

Figure 19:
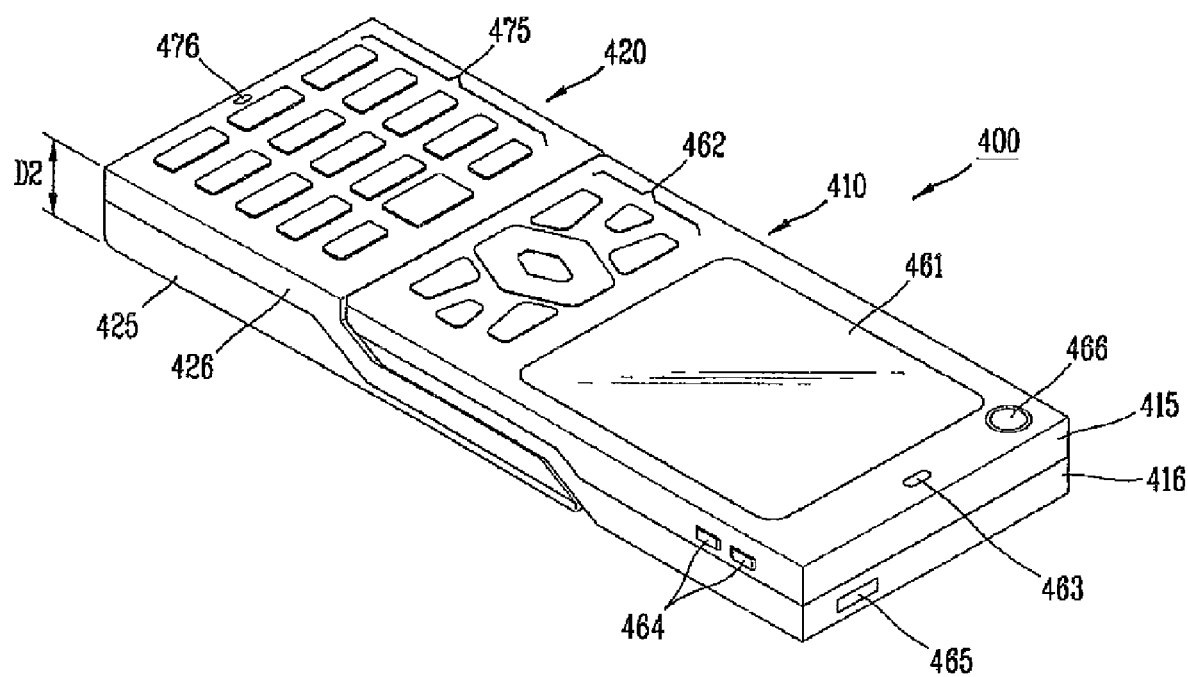
FIG. 19 is a front perspective view showing an open configuration of the mobile terminal in FIG. 18.

FIG. 19 is a front perspective view showing an open configuration of the mobile terminal in FIG. 18. With reference to FIG. 19, the when the upper body 410 is opened with respect to the lower body 420, the upper surface of the upper body 410 and the upper surface of the lower body 420 exposed according to the movement of the upper body 410 are flush with each other, and the lower surface of the lower body 420 and the lower surface of the upper body 410 exposed according to the movement of the lower body 420 are flush with each other. Namely, in the open configuration, the mobile terminal 400 form a single bar type mobile terminal. Accordingly, although the upper body 410 is moved with respect to the lower body 420, a step is not formed therebetween.

A second manipulation unit 475 that inputs information may be disposed on a front surface of the front case 425 of the lower body 420. A third manipulation unit 465 and an external interface 465 may be disposed on at least one of the front case 415 or the rear case 416 of the upper body 410.

The first to third manipulation units 462, 475, and 464 may be generally called a manipulation part, and may be implemented in any type of method so long as a user can manipulate it in a tactile manner. For example, the manipulation units 462, 475 and 464 may be implemented in the form of a dome switch, a touch screen or a touch pad that receives an instruction (command) or information in a push or touch manipulation by the user, or may be implemented in the manner of rotating a key or perform manipulation like a joystick. The instruction or information inputted by the manipulating units 462, 475, and 464 may include numbers, a language of at least one country, a scroll direction, start, end, etc.

In terms of function, the first manipulation unit 462 inputs a command such as start, end and scrolling, etc., and the second manipulation unit 475 inputs numbers, characters or symbols. The third manipulation unit 464 may operate as a hot key for performing a special function such as activating of the first image input unit 166.

The first audio input unit 476 may be implemented in the form of, for example, a microphone in order to receive a voice of the user or other sounds.

As shown in FIG. 17, in the closed configuration in which the upper body 410 completely overlaps with the lower body 420, the mobile terminal mainly operates in a standby mode, and in the open configuration in which the upper body 410 exposes at least a portion of the lower body 420 as shown in FIG. 19, the mobile terminal operates in a call mode or in an editing mode.

The external interface unit 465 may be used as a link (passage or path) through which the terminal can exchange data or the like with an external device.

For example, the external interface unit 465 may be implemented as one of a connection port for connecting an earphone to the mobile terminal via a fixed line or wireless means, a port for short-range communications (e.g., an Infrared Data Association (IrDA) port, a Bluetooth™ port, a wireless LAN port, etc.), power supply ports for providing power to mobile terminal, or the like.

The external interface unit 465 may be a card socket for accommodating an external card, such as a Subscriber Identity Module (SIM), a User Identity Module (UIM), a memory card for storing information, or the like.

The second audio output unit 468 may implement a stereophonic function in conjunction with the first audio output unit 463 and may be used for call communication in a speaker phone mode.

In the above description, the second image input unit 470 and the like is disposed on the lower body 420, but such configuration is not meant to be limited. For example, one or more of the elements such as the second image input unit 470 or the like which are disposed on the rear case 426 in the above description may be mounted on the lower surface of the upper body 410. In this case, those elements disposed on the rear case 416 can be protected (or covered) by the lower body 420 in the closed configuration. In addition, even if the second image input unit 470 is not provided, the first input image unit 466 may be configured to rotate (or otherwise be moved) to thus allow image capturing in various directions.

With such a configuration, the mobile terminal 400 has the opening and closing mechanism as shown in FIGS. 16 to 19, whereby the mobile terminal can have the sufficiently small size in the closed configuration. In addition, when the mobile terminal 400 is open, the upper body 410 overlaps with the lower body 420 in the non-planar direction, making the first manipulation unit 462 and the display unit 461 of the upper body 410 flush with the second manipulation unit 475 of the lower body 420, accomplishing a stable structure in its external appearance and being easily used.

Regarding such shifting to the opened configuration, the upper body 410 is locked such that when an appropriate force is applied to the upper body 410 to achieve a sliding movement with respect to the lower body 420 by means of the operating module that connects the upper and lower bodies 410 and 420, the upper body 410 can be moved in a planar direction along the lower body and then in a non-planar direction to form the open configuration, and when the locked state is released, the upper body 410 is returned to the close configuration.

Figure 20A:
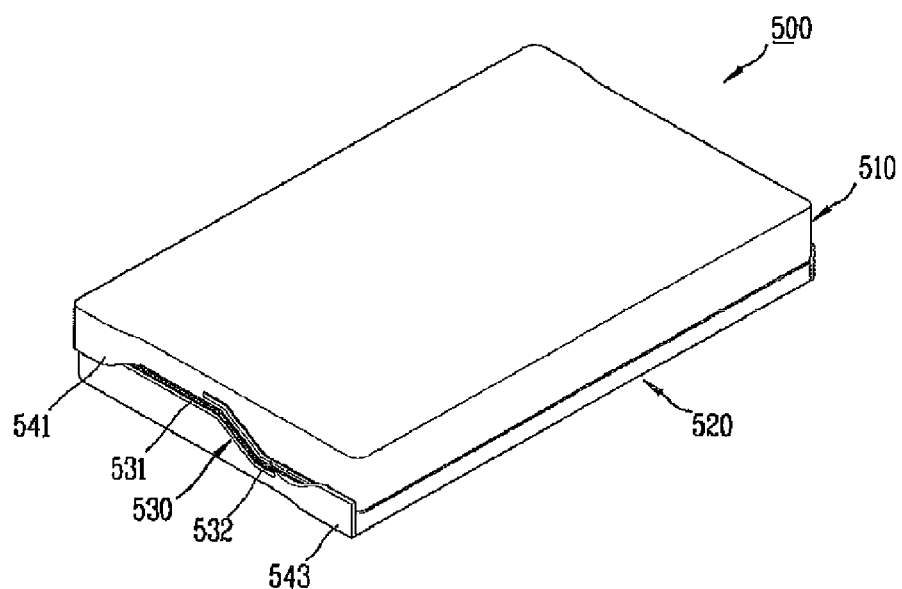
FIG. 20A is a front perspective view of a mobile terminal according to one exemplary embodiment of the present invention.
Figure 20B:
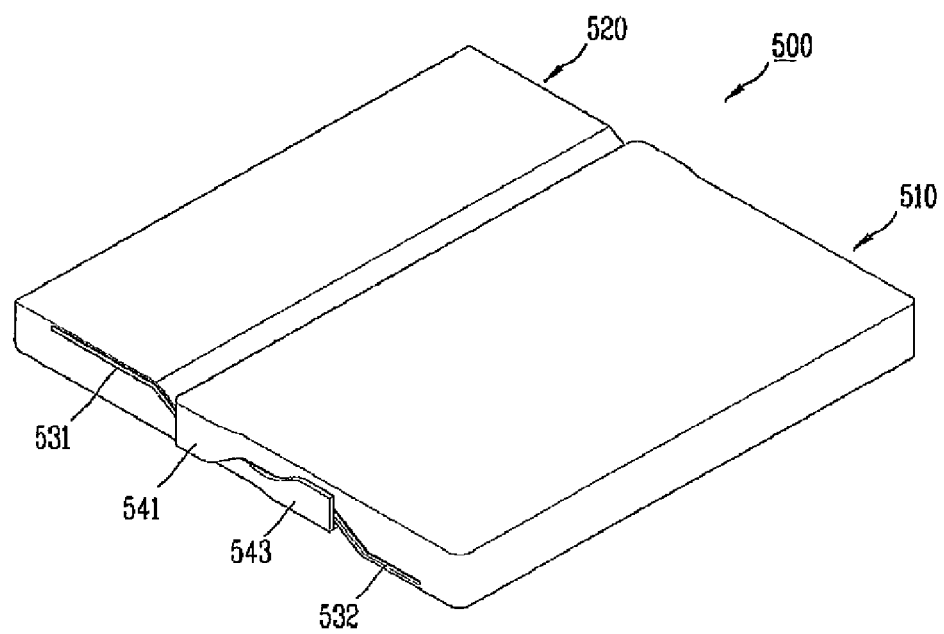
FIG. 20B is a front perspective view showing an open configuration of the mobile terminal in FIG. 20A.

FIG. 20A is a front perspective view of a mobile terminal according to one exemplary embodiment of the present invention, and FIG. 20B is a front perspective view showing an open configuration of the mobile terminal in FIG. 20A.

As shown in FIGS. 20A and 20B, a mobile terminal 500 includes an upper body 510 and a lower body 520 that are combined to be movable with each other. Unlike the former embodiment, the upper body 510 may be moved to be opened and closed in a widthwise direction with respect to the lower body 520.

Functions or components may be disposed in the upper body 510 and the lower body 520 in various manners depending on what kind of functions or user interface the terminal 500 intends to have. For example, a display may be installed on the upper body 510 and a keypad may be installed on the lower body 520. If the mobile terminal 500 intends to have a visual output function, both the upper body 510 and the lower body 520 may include the displays.

Guide units 530 are formed on both sides of the upper and lower bodies 510 and 520 in order to guide the upper and lower bodies 510 and 520 so as to be movable. The configuration and operation of the guide unit 530 are the same as those of the guide unit 130 in the first exemplary embodiment of the present invention, so its detailed description will be omitted.

Figure 21:
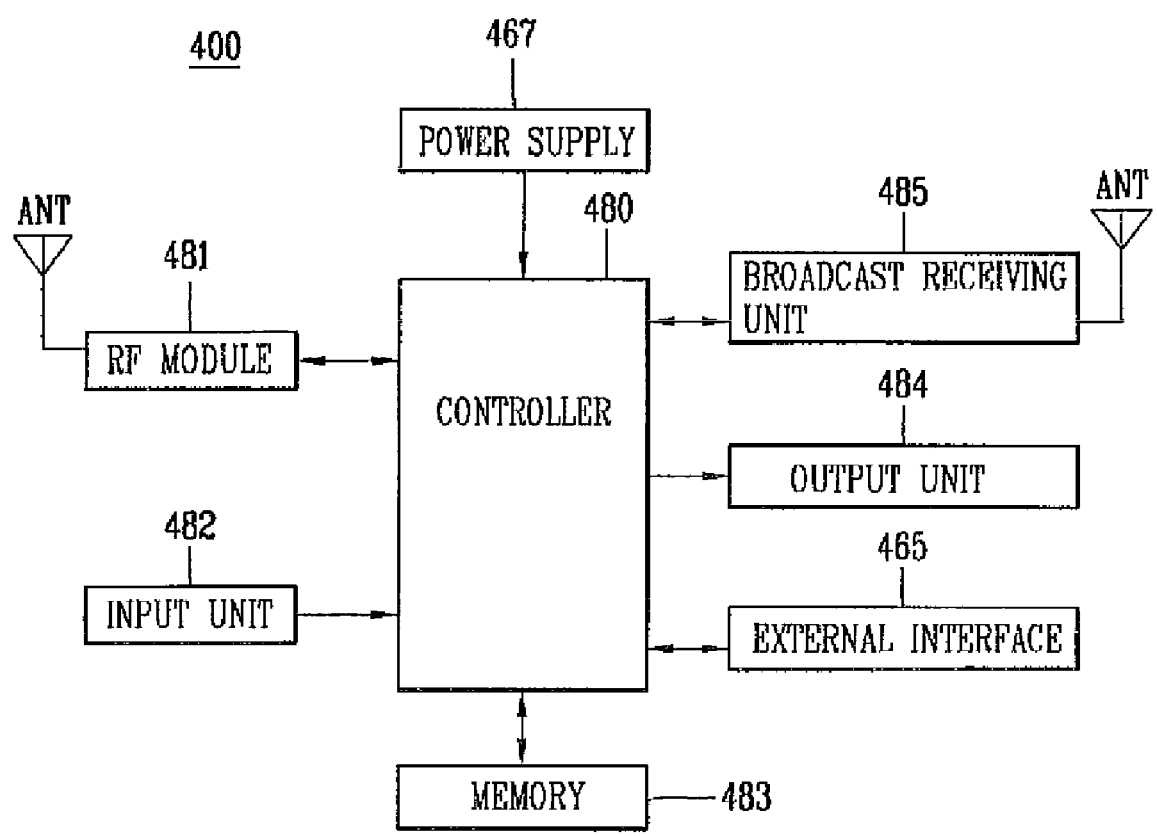
FIG. 21 is a schematic block diagram of a mobile terminal according to an exemplary embodiment of the present invention.

FIG. 21 is a schematic block diagram of a mobile terminal according to an exemplary embodiment of the present invention.

With reference to FIG. 21, the mobile terminal according to an exemplary embodiment of the present invention includes: a wireless communication unit 481 that performs wireless communication with an external device, an input unit 482 that inputs data or control information, an output unit 484 that outputs audio signals or image information, a memory 483 that stores information associated with various programs and data, a broadcast receiving unit 485 that receives broadcast signals, and a controller 480 that controls each element.

The wireless communication unit 481 performs wireless communication with an external terminal or a server via a wireless communication network under the control of the controller 480. The wireless communication may include voice, image and data communications. The wireless communication unit 481 includes a transmitting unit and a receiving unit that transmit/receive radio signals for wireless communication.

The input unit 482 includes the manipulation units 462, 475 and 464, image input units 466 and 470, an audio input unit 476, a sensing unit, etc. The manipulation units 462, 475, and 464 generate signals according to user manipulation and apply the corresponding signals to the controller 480. The image input units 466 and 470 capture still images or video in video call mode, an image capture mode, etc., and apply the captured image data to the controller 480. The audio input unit 476 receives external audio signals in a call mode, a record mode, a voice recognition mode, etc., generates a corresponding signal, and applies the same to the controller 480. The sensing unit senses a current state of the terminal such as an opening/closing state of the terminal, a location of the terminal, as to whether or not a human body contacts with the mobile terminal, etc. and applies the sensing results to the controller 480.

The output unit 484 includes the display unit 461, the audio output units 463 and 468, a vibration unit, a light generating unit, and the like. The display unit 461 displays various state information of the mobile terminal or images outputted when functions of the mobile terminal are performed under the control of the controller 480. The audio output units 463 and 468 output audio signals received from the external or audio signals associated with various functions performed by the mobile terminal under the control of the controller 480. The vibration unit vibrates the mobile terminal under the control of the controller 480, and the light generating unit emits light under the control of the controller 480 so as to be used for illumination or as an indicator.

The memory 483 stores programs for controlling functions of the elements, a UI (User Interface) program for broadcast reception and Internet access, or inputted/outputted data.

The memory 483 includes a hard disk type, a card type memory (e.g., SD or XD memory, etc), a flash memory, a Random Access Memory (RAM), a Read-Only Memory (ROM), and the like.

The broadcast receiving unit 485 receives broadcast signals transmitted via a satellite or a terrestrial wave, etc., under the control of the controller 480. In addition, the broadcast receiving unit 485 may receive supplementary information (Electronic Program Guide (EPG), a channel list, a time table, etc.) or URL information associated with a broadcast.

The external interface 465 transmits a signal transmitted from an external device to the terminal or a signal outputted from the terminal to the external device under the control of the controller.

The power supply unit 467 supplies power required for operations of the respective elements.

The inventive concepts described herein may also be summarized as being related to a mobile terminal comprising: a first body having a major portion and a minor portion; a second body having a major portion and a minor portion; and a slide-slip mechanism that allows the first and second bodies to move between a closed state and an opened state according to a slide-slip movement, wherein the closed state is achieved with the first and second bodies in a stacked configuration, and the opened state is achieved with the first and second bodies in a flat planar configuration.

The major portion of the first body can have a greater thickness than that of the minor portion of the first body, and the major portion of the second body has a greater thickness than that of the minor portion of the second body.

The slide-slip mechanism may comprise a slide assembly and a linkage assembly that allows the slide-slip movement. The slide-slip movement involves movement in a planar direction and in a non-planar direction.

The stacked configuration may be achieved when the major portion of the first body overlaps with the minor portion of the second body, and the minor portion of the first body overlaps with the major portion of the second body.

The flat planar configuration may be achieved when the minor portion of the first body overlaps with the minor portion of the second body, and the major portion of the first body and the major portion of the second body are non-overlapping.

The combined thickness of the overlapping minor portions of the first and second bodies is approximately equal to the individual thickness of the major portion of either the first body or the second body.

A boundary region between the major and minor portions of the first body and a boundary region between the major and minor portions of the second body respectively have a chamfered configuration that facilitates the slide-slip movement. A boundary region between the major and minor portions of the first body and a boundary region between the major and minor portions of the second body may respectively have a sloped surface that facilitates the slide-slip movement. The minor portions of the first and second bodies may respectively have a sloped end that facilitates the slide-slip movement.

As the exemplary embodiments may be implemented in several forms without departing from the characteristics thereof, it should also be understood that the above-described embodiments are not limited by any of the details of the foregoing description, unless otherwise specified, but rather should be construed broadly within its scope as defined in the appended claims. Therefore, various changes and modifications that fall within the scope of the claims, or equivalents of such scope are therefore intended to be embraced by the appended claims.

What is claimed is:

1. A mobile terminal comprising:
    a lower body having a first upper surface and a second upper surface positioned to be lower than the first upper surface;
    an upper body disposed on the lower body and having a first lower surface and a second lower surface lower than the first lower surface; and
    a guide unit that guides the upper and lower bodies to be moved reversibly between a closed configuration in which the first and second upper surfaces face the first and second lower surfaces, respectively, and an open configuration in which the second upper surface faces the first lower surface and the upper body is lowered in a non-planar direction compared with the closed configuration, the guide unit including:
    a pair of first guide rails formed at both sides of the lower body;
    a pair of second guide rails formed at both sides of the upper body and disposed to cross the first guide rails;
    first arm portions formed at both sides of the upper body and restrained to the first guide rails; and
    second arm portions formed at both sides of the lower body and restrained to the second guide rails.

2. The mobile terminal of claim 1, wherein, in the open configuration, an upper surface of the upper body and the first upper surface of the lower body exposed according to a movement of the upper body are flush with each other.

3. The mobile terminal of claim 1, wherein, in the open configuration, a lower surface of the lower body and a lower surface of the upper body exposed according to a movement of the lower body are flush with each other.

4. The mobile terminal of claim 1, wherein the first and second upper surfaces are connected by a slope face.

5. The mobile terminal of claim 4, wherein the first and second lower surfaces is connected by a counter slope face corresponding to the slope face.

6. The mobile terminal of claim 1, wherein each of the first guide rails includes:
    a first horizontal portion formed to be parallel to the first upper surface of the lower body;
    a second horizontal portion formed to be parallel to the second upper surface of the lower body; and
    a slope portion formed to be parallel to the slope face of the lower body, and wherein each of the second guide rails includes:
    a counter first horizontal portion, a counter second horizontal portion and a counter slope portion corresponding to the first horizontal portion, the second horizontal portion and the slope portion.

7. The mobile terminal of claim 6, wherein the first and second guide rails are formed to be opened in the lateral direction of the lower and upper bodies.

8. The mobile terminal of claim 1, further comprising:
an elastic unit that provides elastic force to the first body when the first body is moved with respect to the second body.

9. The mobile terminal of claim 1, wherein a display for displaying information and a first manipulation unit for inputting information is disposed on the upper surface of the upper body, and a second manipulation unit for inputting information is disposed on the first upper surface of the lower body.

10. A mobile terminal comprising:
a lower body having a first upper surface and a second upper surface positioned to be lower than the first upper surface;
an upper body disposed on the lower body and having a first lower surface and a second lower surface lower than the first lower surface; and
a guide unit that guides the upper and lower bodies to be moved reversibly between a closed configuration in which the first and second upper surfaces face the first and second lower surfaces, respectively, and an open configuration in which the second upper surface faces the first lower surface and the upper body is lowered in a non-planar direction compared with the closed configuration;
an elastic unit that provides elastic force to the first body when the first body is moved with respect to the second body, the elastic unit including:
a first slide member fixed on the lower surface of the upper body;
a second slide member slidably restrained to the second slide member;
a spring foamed such that one end thereof is restrained in the first slide member and the other end is restrained in the second slide member, and deformed to provide elastic force to the first slide member while the first slide member is being moved; and
a link member formed such that one end thereof is restrained to the lower body and the other end is restrained to the second slide member.

11. The mobile terminal of claim 10, wherein the spring is installed such that restoration energy is retained as the upper body is moved to a first distance, and after the upper body passes a dead point, the upper body is moved for a second distance by the restoration energy.

12. The mobile terminal of claim 11, wherein the link member has a particular length that allows it to rotate within an acute angle range with respect to the upper surface of the upper body, such that the upper body can move between the closed configuration to the open configuration.

13. A mobile terminal comprising:
a lower body having a first upper surface and a second upper surface positioned to be lower than the first upper surface;
an upper body disposed on the lower body, having a first lower surface and a second lower surface lower than the first lower surface, and connected with the lower body to implement a closed configuration in which the first and second upper surfaces face the first and second lower surfaces, respectively, and an open configuration in which the second upper surface faces the first lower surface and the upper body is lowered in a non-planar direction compared with the closed configuration; and
an operating module that locks the upper body such that when an appropriate force is applied to the upper body to achieve a sliding movement with respect to the lower body, the upper body is moved in a planar direction along the lower body and then in a non-planar direction to make an open configuration, and that returns the upper body to a closed configuration when the locking state is released, the operating module including:
a fixed member fixed to a lower surface of the upper body;
a guide member restrained to the fixed member and guiding the fixing member so as to be moved in a planar direction;
a link member formed such that one end is rotatably supported by the guide member and the other end is rotatably supported by an upper surface of the lower body, to thus move the fixed member and the guide member in a non-planar direction; and
a locking unit that locks the upper body when the fixed member and the guide member are moved in a non-planar direction by the link member.

14. The mobile terminal of claim 13, wherein when the upper body is open, an upper surface of the upper body is flush with a first upper surface of the lower body.

15. The mobile terminal of claim 13, wherein when the lower body is open, a lower surface of the lower body is flush with a lower surface of the upper body.

16. The mobile terminal of claim 13, wherein the fixed member is formed as a plate form parallel to the lower surface of the upper body, and the guide member is formed to cover both ends of the fixed member.

17. The mobile terminal of claim 16, wherein the link member is formed as a pair of link members such that they are spaced apart with a certain distance in the movement direction of the lower body.

18. The mobile terminal of claim 17, wherein a first spring is installed between the guide member and one of the pair of link members in order to apply a restoring force in the direction in which the guide member goes toward the closed configuration.

19. The mobile terminal of claim 18, wherein a second spring is installed between the other of the pair of link members and the lower body in order to apply a restoring force to the link member in a direction in which the upper body is lifted.

20. The mobile terminal of claim 13, wherein the locking unit comprises:
a stop protrusion formed to be protruded from one side of the upper body; and
a stop recess allowing the stop protrusion to be caught therein when the upper body is in the open configuration.

21. The mobile terminal of claim 20, wherein the locking unit comprises:
a first magnet unit disposed on the lower surface of the upper body; and
a second magnet unit disposed on the upper surface of the lower body such that it maintains the open configuration by means of the first magnet unit and the attraction when the upper body is in the open configuration, and it thrusts the upper body in a non-planar direction by means of the first magnet unit and the repulsion when the upper body is moved with a certain distance.

22. The mobile terminal of claim 21, wherein the first and second magnet units are disposed to be parallel to each other.

23. The mobile terminal of claim 13, wherein a chamfer is formed at a lower end of the upper body in order to prevent the upper body from being interfered with by the lower body when the upper body is moved to the open configuration.

24. The mobile terminal of claim 13, wherein a display for displaying information and a first manipulation unit for inputting information may be disposed on the upper surface of the upper body, and a second manipulation unit for inputting information may be disposed on the first upper surface of the lower body.

* * * * *